US008571338B2

(12) United States Patent
Inada et al.

(10) Patent No.: US 8,571,338 B2
(45) Date of Patent: Oct. 29, 2013

(54) IMAGE FILE GENERATION DEVICE, IMAGE PROCESSING DEVICE, IMAGE FILE GENERATION METHOD, AND IMAGE PROCESSING METHOD

(75) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 18 days.

(21) Appl. No.: 13/384,880

(22) PCT Filed: Mar. 12, 2010

(86) PCT No.: PCT/JP2010/001795
§ 371 (c)(1),
(2), (4) Date: Apr. 13, 2012

(87) PCT Pub. No.: WO2011/013263
PCT Pub. Date: Feb. 3, 2011

(65) Prior Publication Data
US 2012/0189221 A1 Jul. 26, 2012

(30) Foreign Application Priority Data
Jul. 28, 2009 (JP) .................................. 2009-175807

(51) Int. Cl.
*G06K 9/36* (2006.01)
(52) U.S. Cl.
USPC ........................................................ 382/240
(58) Field of Classification Search
USPC .................................. 382/232, 233, 240, 244
See application file for complete search history.

(56) References Cited

U.S. PATENT DOCUMENTS

| 6,563,999 | B1 | 5/2003 | Suzuoki |
| 6,763,139 | B1 | 7/2004 | Andrew |

FOREIGN PATENT DOCUMENTS

| JP | 7131658 A | 5/1995 |
| JP | 2006042117 A | 2/2006 |
| JP | 2006304345 A | 11/2006 |

OTHER PUBLICATIONS

Sylvain Fefebvre, et al., Unified Texture Management for Arbitrary Meshes, Repport de recherche, N5210, May 2004, Institut National De Recherche En Informatique Et En Automatique, pp. 1-20.
Martin Kraus, et. al., "Adaptive Texture Maps" The Eurographics Association, Graphics Hardware pp. 1-10, (2002).
International Search Report for corresponding application PCT/JP2010/001795, dated Jun. 22, 2010.
International Preliminary Report on Patentability and Written Opinion for corresponding application PCT/JP2010/001795, dated Feb. 16, 2012.
Extended European search report issued for corresponding European Patent Application No. 10804016.3, dated Nov. 21, 2012.

*Primary Examiner* — Duy M Dang
(74) *Attorney, Agent, or Firm* — Matthew B. Dernier, Esq.; Gibson & Dernier LLP

(57) ABSTRACT

An image hierarchy generation unit reads image data stored in a hard disk drive, generate images with a plurality of resolutions, and hierarchizes the images. An image dividing unit divides the image in each layer into tile images. A redundancy detection unit analyzes the image in each layer so as to detect redundancy between images within the same layer or images from different layers. A tile image reference table creates a tile image reference table that maps area numbers to tile numbers, in view of the redundancy. An image file generation unit creates an image file that should be ultimately output and includes image data and the tile image reference table.

20 Claims, 13 Drawing Sheets

| AREA NUMBER | TILE NUMBER | ENLARGEMENT INFORMATION |
|---|---|---|
| 1 | 1 | |
| 2 | 2 | |
| 3 | 3 | |
| 4 | 4 | |
| 5 | 5 | |
| 6 | 6 | |
| 7 | 2 | ×4:0 |
| 8 | 2 | ×4:1 |
| 9 | 9 | |
| 10 | 10 | |
| 11 | 2 | ×4:2 |
| 12 | 2 | ×4:3 |
| 13 | 13 | |
| 14 | 14 | |
| 15 | 4 | |
| 16 | 4 | |
| 17 | 4 | |
| 18 | 4 | |
| 19 | 4 | |
| 20 | 4 | |

IMAGE FILE GENERATION DEVICE, IMAGE PROCESSING DEVICE, IMAGE FILE GENERATION METHOD, AND IMAGE PROCESSING METHOD

TECHNICAL FIELD

The present invention relates to an image processing technology for enlarging/reducing an image displayed on a display, or moving the image upward, downward, leftward, or rightward.

BACKGROUND ART

Home entertainment systems are proposed capable of playing back moving images as well as running game programs. In home entertainment systems, a GPU generates three-dimensional images using polygons (see, for example, patent document No. 1).

Regardless of the purpose of image display, improvement in efficiency of displaying images is an important and constant challenge. High-speed rendering of high-definition images requires various efforts. For example, there is proposed a method of storing texture data separately to make the process of mapping efficient (e.g., non-patent document Nos. 1 and 2).

PRIOR ART DOCUMENT

Patent Document

Patent Document No. 1 U.S. Pat. No. 6,563,999

Non-Patent Documents

Non-Patent Document No. 1 Sylvain Fefebvre, et. al., Unified Texture Management for Arbitrary Meshes, Repport de recherche, N5210, May 2004, Institut National De Recherche En Informatique Et En Automatique Non-Patent Document No. 2 Martin Kraus, et. al., Adaptive Texture Maps, Graphics Hardware (2002), pp 1-10, The Eurographics Association For responsive display of high-definition images, reduction in data size and high-speed rendering are important and constant challenges. Techniques designed to address these challenges by devising a data structure such as texture mapping as described above involve a problem in that, once the data for a displayed image is built, complex processes are required when a need arises to update a part of an image The present invention addresses the problem as described above and a purpose thereof is to provide image processing technology capable of generating and displaying highly efficiently compressed image data.

SUMMARY OF THE INVENTION

One embodiment of the present invention relates to an image file generation device. The image file generation device comprises: an image hierarchy generation unit configured to generate a plurality of pieces of image data with different resolutions from input image data and generate hierarchical data formed by hierarchizing the plurality of pieces of data as layers according to resolution; an image division unit configured to divide image data at each layer of the hierarchical data into tile images of a predetermined size; a tile image reference table creation unit configured to create a tile image reference table that maps post-division areas in the image data at each layer of the hierarchical data to data for tile images used to render the post-division areas; and an image file generation unit configured to generate an image file that includes data for the tile image and the tile image reference table.

Another embodiment of the present invention relates to an image processing device. The image processing device comprises: a storage device configured to store an image file that includes data for tile images produced by dividing image data into a predetermined size, the image data representing a single image with different resolutions, and includes a tile image reference table that maps post-division areas in the image data in a hierarchical structure produced by hierarchizing the image data according to resolution, to data for tile images used to render the post-division areas; an input information acquisition unit configured to acknowledge a user request to change a display area including shift on an image plane and change in resolution; a tile image identification unit configured to identify data for a tile image necessary to render an area that should be newly displayed in response to the request to change a display area, by referring to the tile image reference table; and a displayed image processing unit configured to read the data for the identified tile image from the storage device and to render the area that should be newly displayed.

Still another embodiment of the present invention relates to an image file generation method. The image processing method comprises: reading image data from a memory, generating a plurality of pieces of image data with different resolutions, and generate hierarchical data formed by hierarchizing the plurality of pieces of data as layers according to resolution; dividing image data at each layer of the hierarchical data into tile images of a predetermined size; creating a tile image reference table that maps post-division areas in the image data at each layer of the hierarchical data to data for tile images used to render the areas; and generating an image file that includes data for the tile image and the tile image reference table and outputting the table to the memory.

Yet another embodiment of the present invention relates to an image processing method. The image processing method comprises: reading, from a memory, an image file that includes data for tile images produced by dividing image data into a predetermined size, the image data representing a single image with different resolutions, and includes a tile image reference table that maps post-division areas in the image data in a hierarchical structure produced by hierarchizing the image data according to resolution, to data for tile images used to render the post-division areas; acknowledging a user request to change a display area including shift on an image plane and change in resolution; identifying data for a tile image necessary to render an area that should be newly displayed in response to the request to change a display area, by referring to the tile image reference table; and rendering the area that should be newly displayed based on the data for the identified tile image.

Still another embodiment of the present invention relates to a data structure of an image file. The data structure is for an image file read from a storage device to display at least a part of an image on a display, the data structure mapping data for tile images to a tile image reference table, the data for tile images being produced by dividing image data into a predetermined size, the image data representing a single image with different resolutions, and the tile image reference table mapping post-division areas in the image data in a hierarchical structure produced by hierarchizing the image data according to resolution to data for tile images used to render the post-division areas, wherein the tile image reference table maps data for a given tile image to a plurality of areas, and the image file does not include data for a tile image that is not mapped in the tile image reference table.

Optional combinations of the aforementioned constituting elements, and implementations of the invention in the form of methods, apparatuses, systems, computer programs, data structures, and recording mediums may also be practiced as additional modes of the present invention.

According to the present invention, an image processing device capable of building image data for showing an image in a wide range of resolutions is provided.

DETAILED DESCRIPTION OF THE INVENTION

First Embodiment

Image data subject to processing according to this embodiment has a hierarchical structure comprising images of different resolutions generated by reducing the size of an original image in a plurality of stages. An image in each layer is divided into one or a plurality of tile images. For example, the image with the lowest resolution comprises one tile image. The original image with the highest resolution comprises the largest number of tile images. Images are displayed such that an enlarged view or reduced view is presented efficiently by switching an image currently used for rendering to a tile image of a different layer when the displayed image reaches a predetermined resolution.

Figure 1:
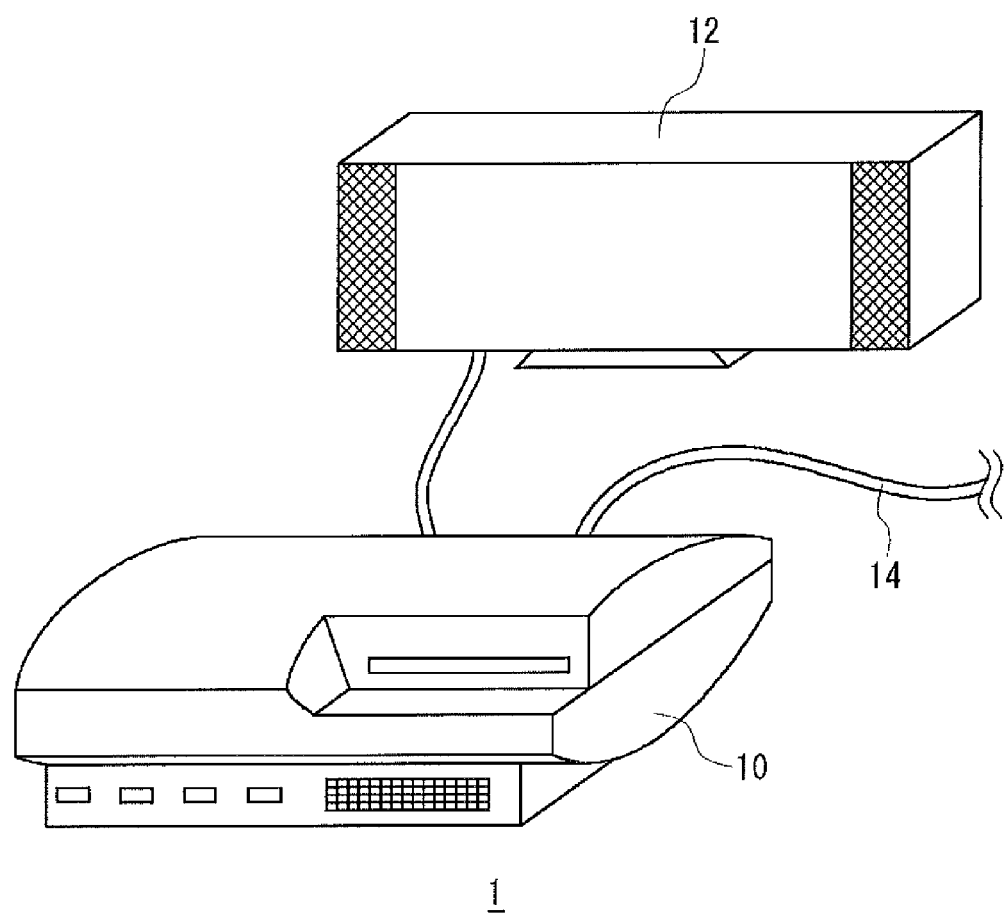
FIG. 1 shows an environment in which the image processing system according to the first embodiment is used.

A description will be given of the basic mode of displaying an image having a hierarchical structure such as that described above. FIG. 1 shows an environment in which an image processing system 1 according to an embodiment of the present invention is used. The image processing system 1 comprises an image processing device 10 configured to run image processing software and a display device 12 configured to output a result of processing by the image processing device 10. The display device 12 may be a television set provided with a display for outputting an image and a speaker for outputting sound. The display device 12 may be connected to the image processing device 10 by cable or connected wirelessly using, for example, wireless LAN (Local Area Network). The image processing device 10 in the image processing system 1 may be connected to an external network such as the Internet by a cable 14 and download and acquire hierarchized compressed image data. The image processing device 10 may be connected to an external network wirelessly.

The image processing device 10 may be a game device so that image processing functionality is achieved by loading an application for image processing. The image processing device 10 may be a personal computer so that image processing functionality is achieved by loading an application for image processing.

The image processing device 10 changes a display area by enlarging/reducing an image displayed on the display of the display device 12 or moving the image upward, downward, leftward, or rightward, in accordance with a user request. When the user manipulates an input device by viewing an image displayed on the display, the input device transmits a request signal to change a display area to the image processing device 10.

Figure 2:
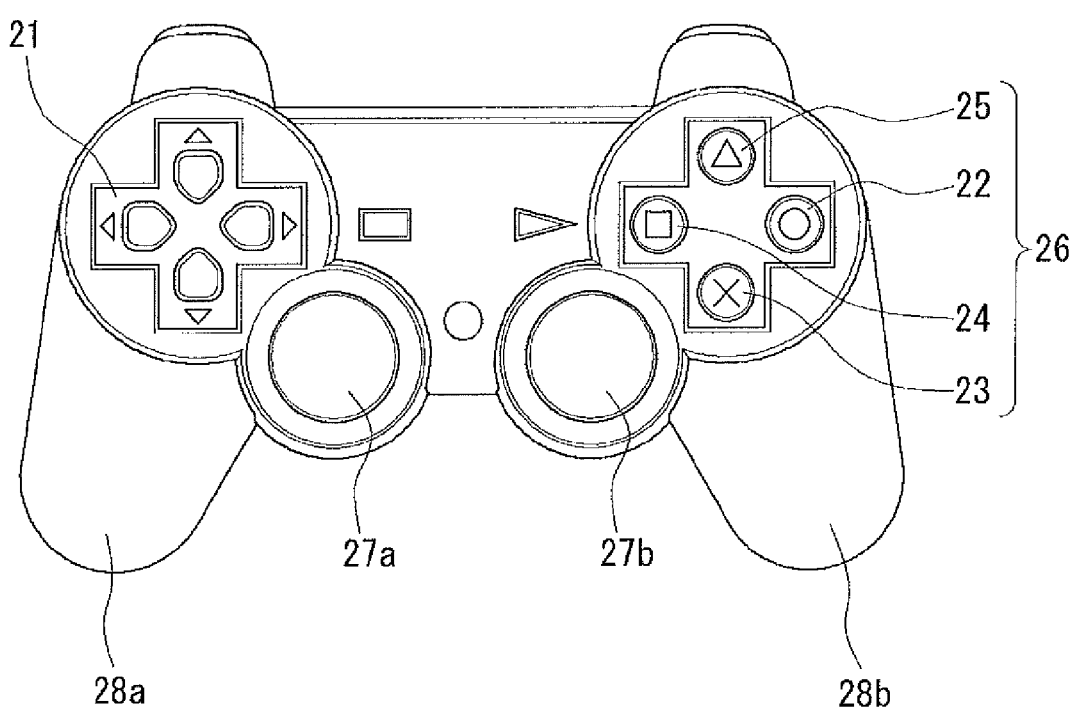
FIG. 2 shows the appearance of the input device that can be applied to the image processing system of FIG. 1.

FIG. 2 shows the appearance of the input device 20. The input device 20 is provided with directional keys 21, analog sticks 27a, 27b, and four control buttons 26, which are means for user control. The four buttons 26 comprises a circle button 22, a cross button 23, a square button 24, and a triangle button 25.

The user control means of the input device 20 in the information processing system 1 is assigned the function of entering a request for enlarging/reducing a displayed image, and entering a request for scrolling upward, downward, leftward, or rightward. For example, the function of entering a request for enlarging/reducing a displayed image may be allocated to the right analog stick 27b. The user can enter a request to reduce a displayed image by pulling the analog stick 27b toward the user and can enter a request to enlarge a displayed image by pushing it away from the user. The function of entering a request for moving a display area may be allocated to the directional keys 21. By pressing the directional keys 21, the user can enter a request for movement in the direction in which the directional keys 21 is pressed. The function of entering a request to change an image may be allocated to alternative user control means. For example, the function of entering a request for scrolling may be allocated to the analog stick 27*a*.

The input device 20 has the function of transferring an input signal requesting change of a display area to the image processing device 10. In the embodiment, the input device 20 is configured to be capable of communicating with the image processing device 10 wirelessly. The input device 20 and the image processing device 10 may establish communication using the Bluetooth (registered trademark) protocol or the IEEE802.11 protocol. The input device 20 may be connected to the image processing device 10 via a cable so as to transfer a signal requesting change of a display area to the image processing device 10 accordingly.

Figure 3:
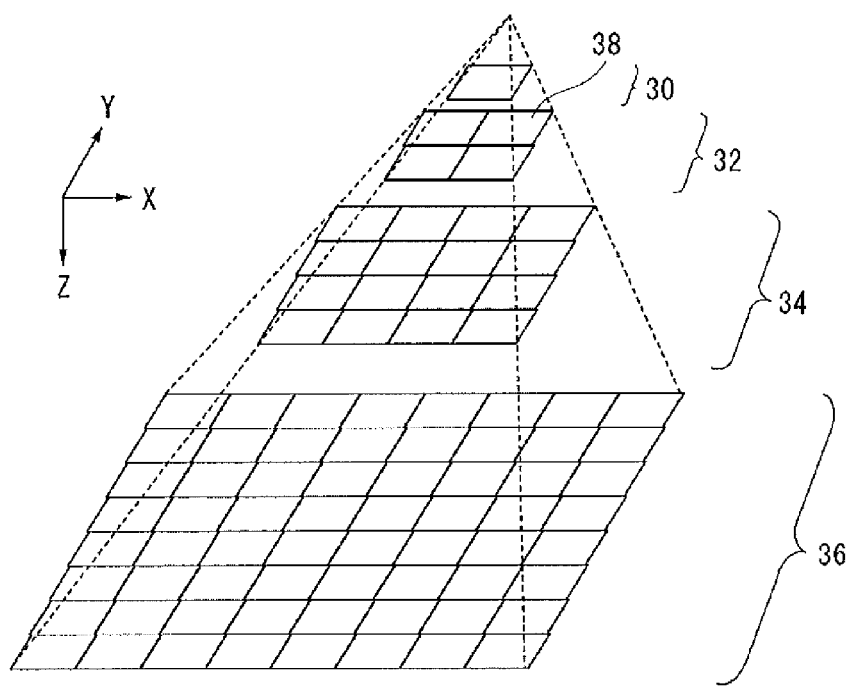
FIG. 3 shows the hierarchical structure of image data used in the first embodiment.

FIG. 3 shows the hierarchical structure of image data used in the embodiment. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical data".

The hierarchical image data shown in FIG. 3 has a quadtree hierarchical structure. Each layer comprises one or more tile images 38. All of the tile images 38 are formed to have the same size having the same number of pixels. For example, an image includes 256 256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

The hierarchical image data is compressed in a predefined compression format and is stored in a storage device and is read from the storage device and decoded before being displayed on the display. The image processing device 10 according to the embodiment is provided with the decoding function compatible with a plurality of compression formats. For example, the device is capable of decoding compressed data in the S3TC format, JPEG format, JPEG2000 format. Compression may be performed for each tile image. Alternatively, a plurality of tile images included in the same layer or a plurality of layers may be compressed at a time.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of change in the displayed image by referring to the signal supplied from the input device 20 and requesting change of a display area, the image processing device 10 uses the amount of change to derive the coordinates at the four corners of a frame (frame coordinates) in the virtual space. Frame coordinates in the virtual space are used to load data into the main memory or generate a displayed image. Instead of the frame coordinates in the virtual space, the image processing device 10 may derive information identifying the layer and the texture coordinates (UV coordinates) in the layer. Hereinafter, the combination of the information identifying the layer and the texture coordinates will also be referred to as frame coordinates.

Figure 4:
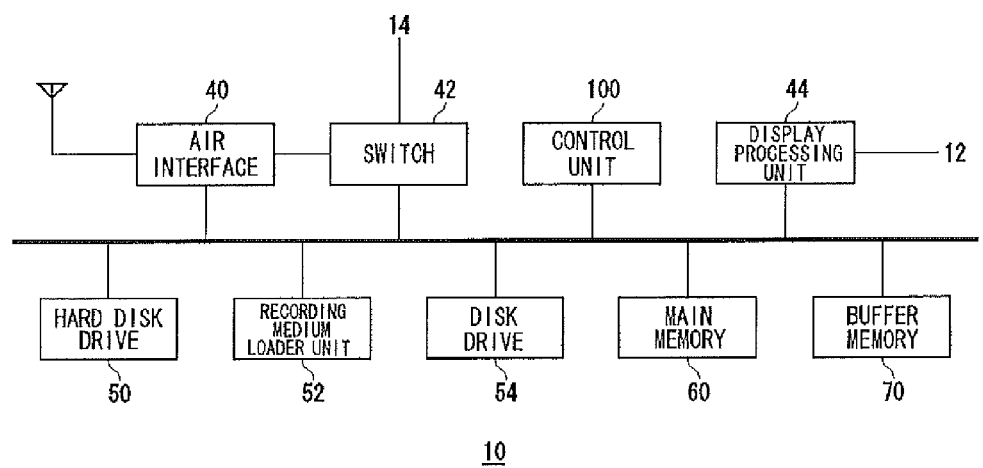
FIG. 4 shows the configuration of the image processing device according to the first embodiment.

FIG. 4 shows the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 is connected to an external network via the cable 14 so as to receive hierarchized compressed image data from an image server. The switch 42 is connected to the air interface 40. The air interface 40 is connected to the input device 20 using a predefined wireless communication protocol. A signal requesting change of a display area as input by the user via the input device 20 is supplied to the control unit 100 via the air interface 40 and the switch 42.

The hard disk drive 50 functions as a storage device for storing data. The compressed image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The compressed image data may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The image processing device 10 according to the embodiment is configured to previously load part of the compressed image data from the hard disk drive 50 into the main memory 60 in order to change a displayed image smoothly as the displayed image is enlarged/reduced or the display area is moved. Further, the device 10 is configured to previously decode part of the compressed image data loaded into the main memory 60 and store the decoded data in the buffer memory 70. This allows instant switching of images used for creation of displayed image when the switching is required later.

Figure 5:
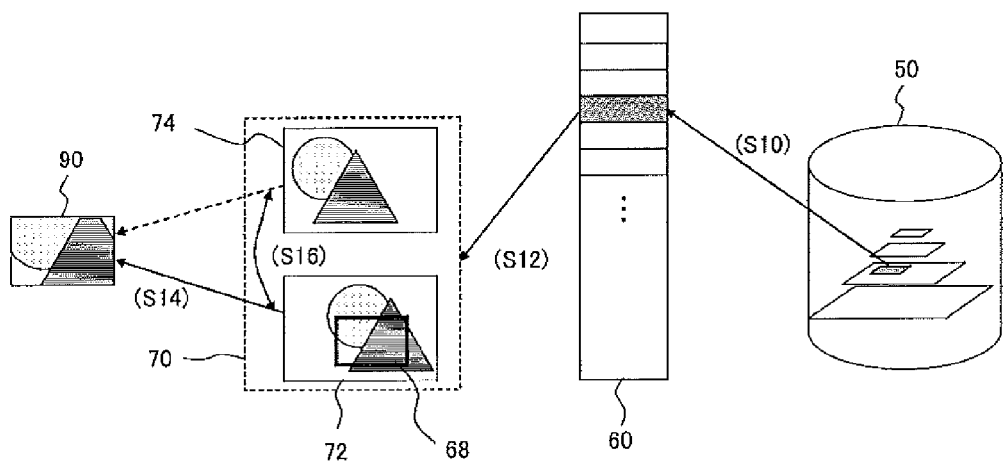
FIG. 5 schematically shows the flow of image data according to the first embodiment.

FIG. 5 schematically shows the flow of image data according to the embodiment. Hierarchical data is stored in the hard disk drive 50. A recording medium mounted on the recording medium loader unit 52 or the disk drive 54 may store the data instead of the hard disk 50. Alternatively, the image processing device 10 may download hierarchical data from an image server connected to the device 10 via the network. As described above, the hierarchical data is compressed in a fixed-length format such as S3TC or in a variable-length format such as JPEG.

Of the hierarchical data, part of the image data is loaded into the main memory 60, maintaining a compressed state (S10). An area to be loaded is determined according to a predefined rule. For example, an area close to the currently displayed image in the virtual space, or an area predicted to be frequently requested for display, from a viewpoint of the content of image or the history of browsing by the user, is loaded. The data is loaded not only when a request to change an image is originated but also at predefined time intervals. This prevents heavy traffic for loading processes from occurring in a brief period of time.

Compressed image data is loaded in units of blocks having a substantially regular size. For this reason, the hierarchical data stored in the hard disk drive 50 is divided into blocks according to a predefined rule. In this way, data management in the main memory 60 can be performed efficiently. Even if the compressed image data is compressed in a variable-length format, the data as loaded would have an approximately equal size if the image is loaded in units of blocks (hereinafter, referred to as "image blocks"). Therefore, a new loading operation is completed basically by overwriting one of the blocks already stored in the main memory 60. In this way, fragmentation is unlikely to occur, the memory is used efficiently, and address management is easy.

Of the compressed image data stored in the main memory 60, data for an image of an area required for display, or data for an image of an area predicted to be necessary is decoded and stored in the buffer memory 70 (S12). The buffer memory 70 includes at least two buffer areas 72 and 74. The size of the buffer areas 72 and 74 is configured to be larger than the size of the frame memory 90 so that, when the signal entered via the input device 20 requests a change, in the display area, of a certain degree or less, the image data loaded in the buffer areas 72 and 74 is sufficient to create a displayed image.

One of the buffer areas 72 and 74 is used to store an image for creation of displayed image and the other is used to make available an image predicted to become necessary subsequently. Hereinafter, the former buffer will be referred to as "display buffer" and the latter will be referred to as "decoding buffer". In the example of FIG. 5, the buffer area 72 is a display buffer, the buffer area 74 is a decoding buffer, and a display area 68 is being displayed. The image stored in the decoding buffer in a prefetch process described below may be of the same layer as the image stored in the display buffer or of a different layer with a different scale.

Of the images stored in the buffer area 72, i.e., the display buffer, the image of the display area 68 is rendered in the frame memory 90 (S14). Meanwhile, the image of a new area is decoded as necessary and stored in the buffer area 74. The display buffer and the decoding buffer are switched depending on the timing of completion of storage or the amount of change of the display area 68 (S16). This allows smooth switching between displayed images in the event of the movement of a display area or change in the scale.

Figure 6:
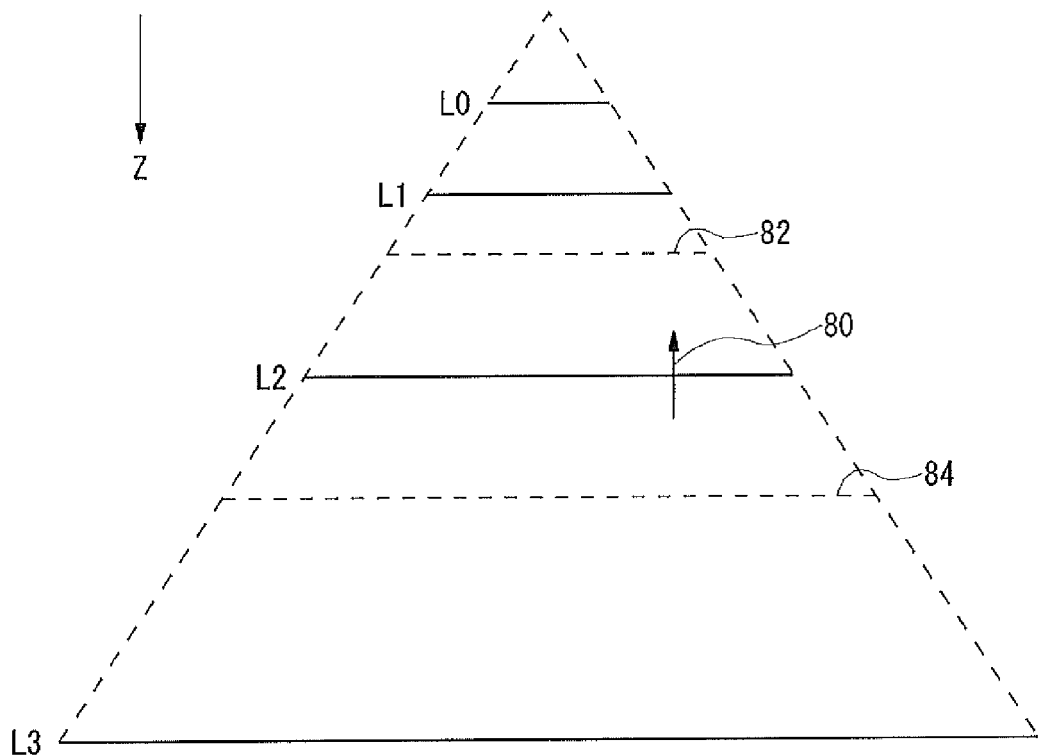
FIG. 6 shows a prefetch process for prefetching image data according to the first embodiment.

FIG. 6 shows a prefetch process. FIG. 6 shows the structure of hierarchical data. The layers are represented as L0 (0-th layer), L1 (first layer), L2 (second layer), and L3 (third layer), respectively. In the hierarchical data structure shown in FIG. 6, the position in the depth (Z axis) direction indicates the resolution. The closer to L0, the lower the resolution, and, the closer to L3, the higher the resolution. In terms of the size of the image displayed on the display, the position in the depth direction represents the scale. Assuming that the scale of the displayed image in L3 is 1, the scale in L2 is ¼, the scale in L1 is 1/16, and the scale in L0 is 1/64.

Therefore, if the displayed image changes in the depth direction away from L0 toward L3, the displayed image is enlarged. If the displayed image changes in the direction away from L3 toward L0, the displayed image is reduced. An arrow 80 indicates that a signal requesting a change in the display area input by a user requests reduction in the displayed image and shows that reduction occurs across the scale ¼(L2). In the image processing device 10, the position of L1, L2, which are made available as tile images 38, in the direction of depth is defined as the boundary of prefetching in the depth direction. When a signal requesting a change in the image indicates crossing the prefetch boundary, the prefetch process is started.

When the scale of the displayed image is close to L2, the displayed image is generated by using the tile image in L2 (second layer). More specifically, the L2 image is used when the scale of the displayed image is between a switching boundary 82 and a switching boundary 84, the boundary 82 being between the image in L1 and the image in L2, and the boundary 84 being between the image in L2 and the image in L3. Therefore, when reduction of an image is requested as indicated by an arrow 80, the enlarged version of the tile image in L2 is turned into a reduced version and displayed. Meanwhile, the image processing device 10 also identifies the tile image 38 expected to be necessary in the future based on the signal requesting a change in the image and decodes the identified image. In the example of FIG. 6, when the reduction scale requested by the signal requesting a change in the display area exceeds L2, the image processing device 10 prefetches the tile image 38 in L1, which is located in the direction of reduction, from the hard disk drive 50 or the main memory 60, decodes the read image, and writes the decoded image in the buffer memory 70.

Prefetching in the upward, downward, leftward, or rightward direction in the identical layer is also processed in a similar manner. More specifically, the prefetch boundary is set in the image data stored in the buffer memory 70 so that, when the display position indicated by the signal requesting a change in the image exceeds the prefetch boundary, the prefetch process is started.

Figure 7:
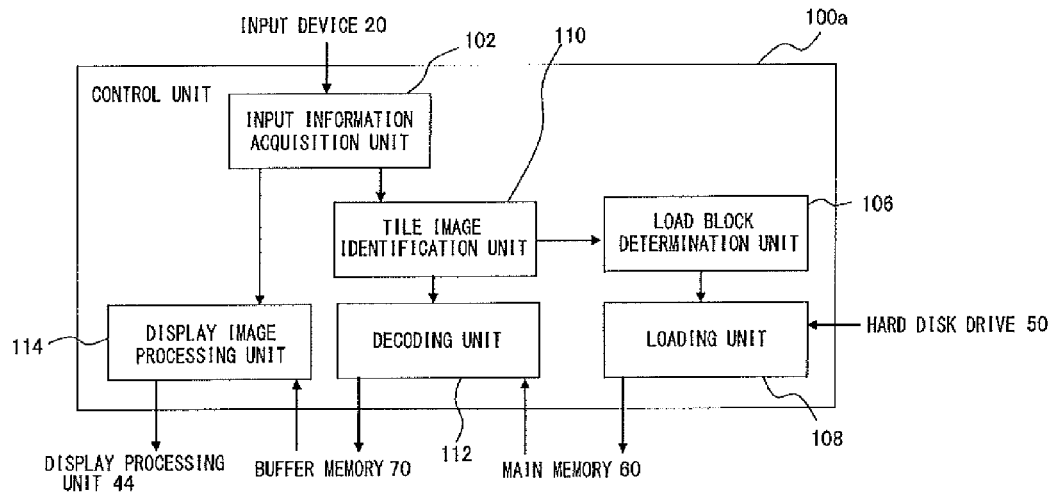
FIG. 7 shows the configuration of the control unit having the function of displaying hierarchical data according to the first embodiment.

FIG. 7 shows the configuration of the control unit 100a having the function of displaying hierarchical data mentioned above according to the embodiment in detail. The control unit 100a comprises an input information acquisition unit 102 for acquiring information entered by the user via the input device 20, a tile image identification unit 110 for identifying a tile including an area that should be newly displayed, a loaded block determination unit 106 for determining an image block that should be newly loaded, and a loading unit 108 for loading a necessary image block from the hard disk drive 50. The control unit 100a further comprises a decoding unit 112 for decoding compressed image data and a displayed image processing unit 114 for rendering a displayed image.

The elements depicted in FIG. 7 as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof.

The input information acquisition unit 102 acquires an instruction entered by the user via the input device 20 to start/terminate displaying an image, move the display area, enlarge or reduce the displayed image, etc. The tile image identification unit 110 identifies a tile image including an area that should be displayed, in accordance with the frame coordinates of the current display area and the information on the request to change the display area input by the user. If the tile image is already loaded in the main memory 60, the tile image identification unit 110 supplies the information obtained as a result of the identification to the decoding unit 112. If not, the tile image identification unit 110 supplies the information to the loaded block determination unit 106. In addition to the image necessary to render the current displayed image, the tile image identification unit 110 may identify a tile image predicted to be necessary subsequently.

The loaded block determination unit 106 identifies an image block that should be newly loaded from the hard disk 50 into the main memory 60 by referring to the information from the tile image identification unit 110 and issues a load request to the loading unit 108. While the loading unit 108 is not performing loading process, the loaded block determination unit 106 may issue a load request according to a predetermined timing schedule. For example, the loaded block determination unit 106 may issue a load request at predetermined time intervals or when the user issues a request to change the display area. The loading unit 108 performs an actual loading process in accordance with a request from the loaded block determination unit 106.

The decoding unit 112 reads and decodes the data for the tile image from the main memory 60 by referring to the information on the tile image acquired from the tile image identification unit 110 and stores the decoded data in the decoding buffer or the display buffer. The displayed image processing unit 114 refers to the frame coordinates of the new displayed image, reads the corresponding image data from the display buffer in the buffer memory 70, and renders the data in the frame memory of the display processing unit 44.

Figure 8:
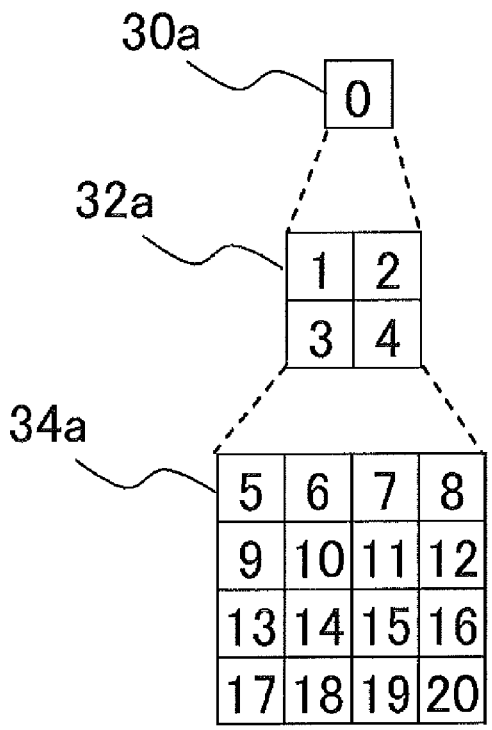
FIG. 8 schematically shows images in respective layers in hierarchical data used in the first embodiment.

A description will now be given of the structure of tile images and image blocks in the hierarchical data. FIG. 8 schematically shows images in respective layers in hierarchical data. Referring to FIG. 8, the hierarchical data comprises a 0-th layer 30a, a first layer 32a, and a second layer 34a. Each of the partitions marked by solid lines in images in the respective layers represents a tile image. As shown in the figure, an identification number (hereinafter, referred to as "tile number") is assigned to each tile image when the tile image is produced by dividing the original image. For example, the image in the 0-th layer 30a comprises one tile image with a tile number "0". Tile numbers "1"-"4" and "5"-"20" are assigned to the tile images in the first layer 32a and the second layer 34a.

Figure 9:
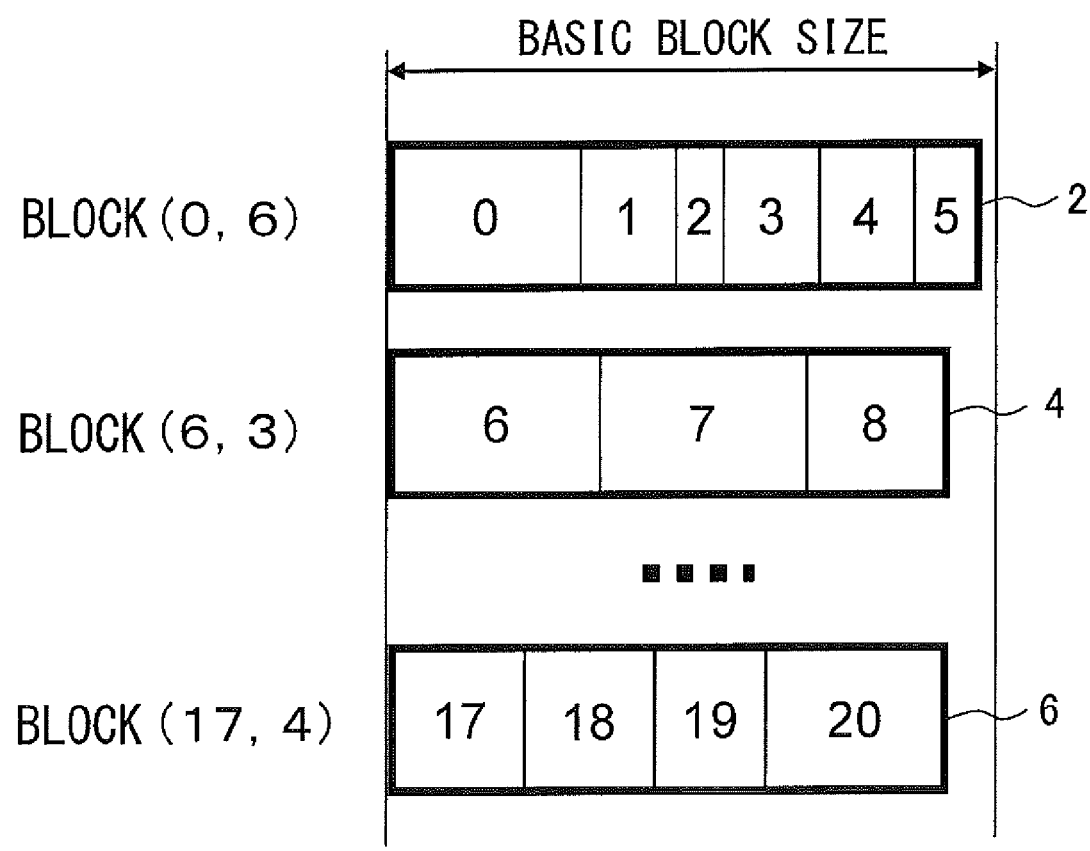
FIG. 9 schematically shows image blocks generated from the hierarchical data of FIG. 8.

FIG. 9 schematically shows image blocks created from the hierarchical data of FIG. 8. As described above, image blocks are created by organizing the tile images, starting with the smallest tile number, such that each group contains the largest possible number of tile images on the condition that a predetermined data size is not exceeded. The figure indicates "a predefined data size" as "a basic block size", which is illustrated as a range marked by an arrow.

In the illustrated example, tile images with the tile numbers "0" through "5" are organized as an image block 2, tile images "6" through "8" are organized as an image block 4, etc. Tile images "17" through "20" are organized as the last image block 6. Each image block is identified by the tile number of the start tile image in the block and the number of tile images included. Therefore, the image block 2 has identification information "(0, 6)", the image block 4 has identification information "(6, 3)", and the image block 6 has identification information "(17, 4)". By defining identification information thus, it is easy to determine whether a given tile image is included in an image block. In practice, all image blocks are arranged in series in an image file containing image data.

Identification information on image blocks is stored in the hard disk drive 50 by associating the identification information with information on an area in the hard disk drive 50 storing the corresponding compressed image data. Division of compressed hierarchical data into image blocks of about the same size is advantageous in that, given the image blocks loaded and stored in continuous areas in the main memory 60, blocks can be stored by overwriting an image block by a subsequently loaded image block. The likelihood of fragmentation is reduced and the main memory 60 can be used efficiently.

A description will be given of an embodiment in which the technique of displaying image data having a hierarchical structure is elaborated so that image data is efficiently built and output. In the above-described basic method of displaying images, the tile number of a tile image necessary for display is uniquely identified from the post-change frame coordinates known from a request to change a display area. In this procedure, the tile number is equivalent to a parameter indicating the position in an image in each layer. Therefore, data for a tile image is directly identified from the frame coordinates, as shown in FIG. 8.

Meanwhile, the embodiment provides flexibility in designation of data for a tile image by isolating the parameter indicating the position in an image from the data for a tile image, thereby achieving efficient data structure and image updating. For this purpose, a table describing correspondence between the position in an image and the data for a tile image is appended to the image data. To display image data built as described above, the parameter indicating the position in an image is obtained from the frame coordinates occurring after the displayed area is changed, and the identification number for the data for a tile image, i.e. the tile number, is obtained by referring to the above-mentioned table, using the obtained parameter as a key. The "parameter indicating the position in an image" is an identification number assigned to areas produced when an image is divided into tile images as shown in FIG. 8. However, the parameter need not match the tile number, according this embodiment. Hereinafter, the identification number assigned to an area will be referred to as "area number" in distinction from the tile number.

Figure 10:
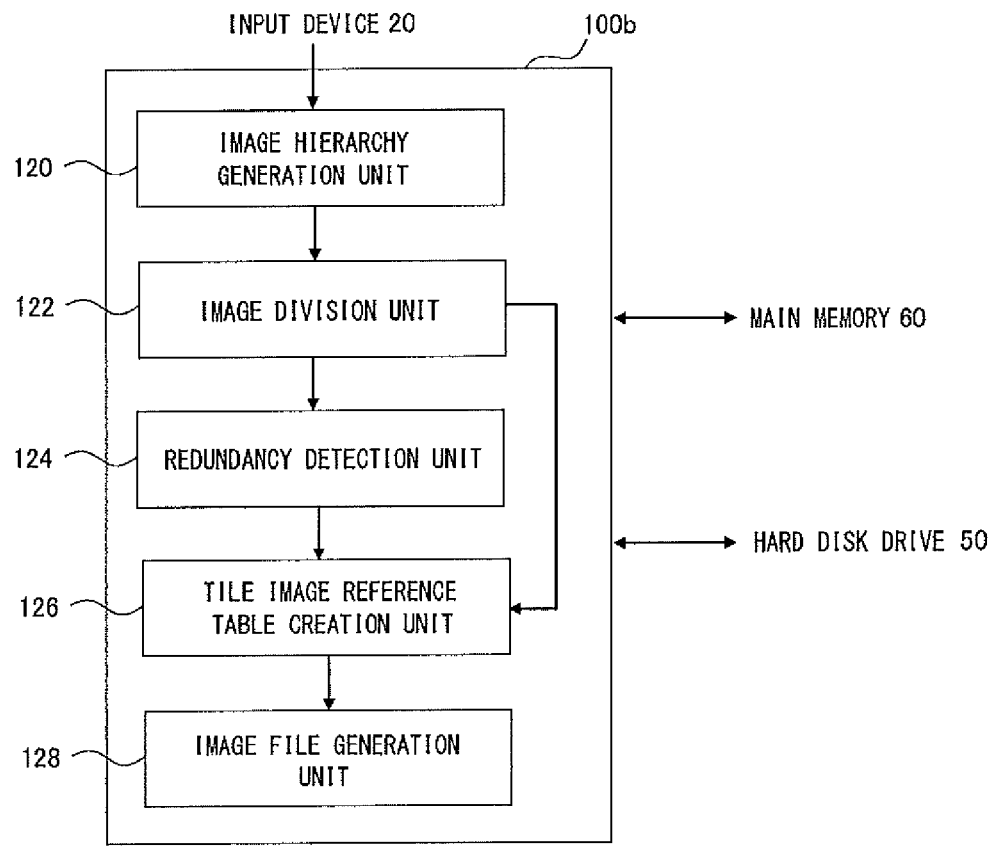
FIG. 10 shows the configuration of a control unit having the function of generating an image file for display according to the first embodiment.

FIG. 10 shows the configuration of a control unit 100b having the function of generating an image file for display according to the embodiment. The control unit 100b may be provided with the function for image display like the control unit 100a shown in FIG. 7, but the function is not illustrated in FIG. 10. The image processing device 10 provided with the control unit 100b having only the function shown in FIG. 10 may be provided apart from the image processing device exhibiting the display function.

The control unit 100b includes an image hierarchy generation unit 120 configured to read image data stored in the hard disk drive 50 and hierarchize the data, an image division unit 122 configured to divide the image in each layer into tile images, a redundancy detection unit 124 configured to analyze the image in each layer and detect redundancy, a tile image reference table creation unit 126 configured to create a tile image reference table that maps area numbers to tile numbers, in view of redundancy, and an image file generation unit 128 configured to generate an image file that should be ultimately output and that includes image data and a tile image reference table.

The image hierarchy generation unit 120 reads from the hard disk drive 50 data for an image for which a file should be created. The image data read may be a single item of image data of a certain resolution or higher. The image data subject to processing may be designated by the user via the input device 20 as shown. Alternatively, a request may be acknowledged from another functional block (not shown) that obtained the original image. The image hierarchy generation unit 120 then generates image data of a hierarchical structure including the original image, by reducing the data for the read image in stages defined by respective resolutions to generate data for reduced image data.

The image division unit 122 generates data for tile images by dividing an image in each layer into predetermined sizes. A tile number is assigned to generated tile image. The data of each time image is temporarily stored in the main memory 60 and the area of storage is managed by the tile number. The tile number assigned in this process may reflect the position in the image as shown in FIG. 8. For example, the tile number may match the area number.

The redundancy detection unit 124 detects the redundancy between images within the same layer or images from different layers, by analyzing the tile images in the respective layers. For example, redundancy within the same layer may occur when the same image data can be used as a plurality of tile images. Redundancy across different layers may occur when an image produced from enlarging an image in a low-resolution layer does not look so different from an image in a high-resolution layer. Areas with redundancy as described above can be displayed by consistently using a given tile image and without maintaining individual tile images. This will make it possible to compress image data. A specific method will be described later.

The tile image reference table creation unit 126 creates a tile image reference table that maps area numbers in the image in each layer in the hierarchical data to tile numbers used to display the areas. In an image where redundancy is not detected, the area number corresponds one-to-one to the identification number of a tile image. For example, the same numeral is used for the area number and the tile number. Meanwhile, in an image area having redundancy, a single tile number is mapped to a plurality of area numbers so that the data for the tile image is shared.

The image file generation unit 128 reads the data for the tile image referred to in the tile image reference table and generates ultimate image data by concatenating the data sequentially. In this process, image blocks are formed by organizing tile images until a certain size is reached as described above. The data is managed block by block, by mapping the identification information of an image block to an offset value indicating an offset from the start address of the image data. The image file generation unit 128 forms the ultimate output data by generating an image file including the image data and the tile image reference table.

Thus, the size of image data can be efficiently reduced by detecting redundancy between images and using a single tile image to render a plurality of areas. The image data according to the embodiment is such that images with different resolutions are included in the same image. Therefore, the data can be compressed at a high rate by using data for a given tile image to represent images from different layers.

Figure 11:
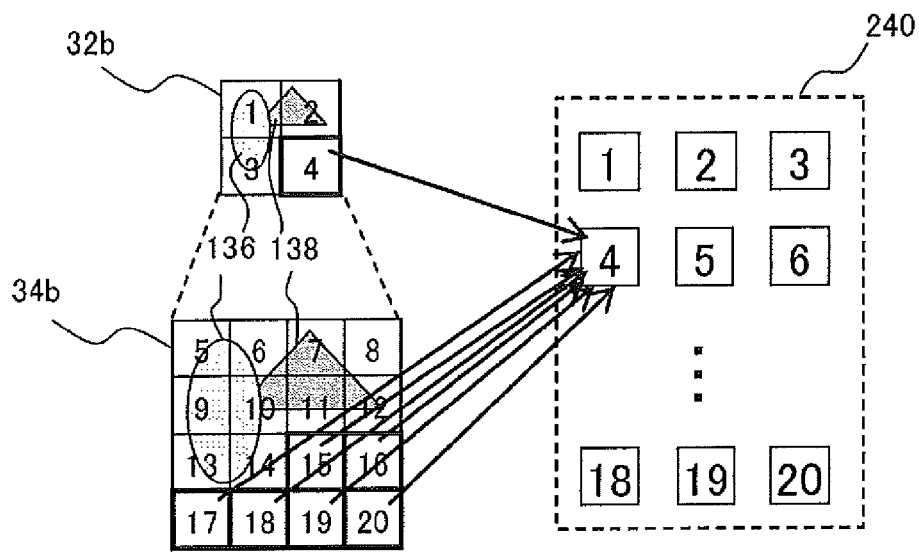
FIG. 11 schematically shows an example of correspondence built between area numbers and tile image data according to the first embodiment when there is redundancy between images.

FIG. 11 schematically shows an example of correspondence built between area numbers and tile image data when there is redundancy between images. Referring to FIG. 11, an image 32b and an image 34b are images from two layers, namely, the first layer and the second layer, included in given hierarchical data. In other words, the image 32b is obtained by reducing the image 34b. The grids shown in the images 32b and 34b indicate boundaries for dividing the image into tile images. An area number is assigned to each area marked by the boundary. The area number may be fixed regardless of the image. The order of assigning numbers may not be as illustrated.

It will be assumed that an ellipse 136 and a triangle 138 are drawn in the image 32b and the image 34b and the other areas are filled with a single color to represent the background. Data 240 for tile images extracted from the areas in the images is stored in the main memory 60 independent of the initial arrangement of images. Tile numbers are assigned to the data 240 for the tile images. The tile image reference table maps area numbers in the images 32b and 34b to tile numbers. The table shows the correspondence indicated by the arrows in the figure.

The area number "4" in the image 32b, which is an area filled with a single color, is mapped to the data for the tile image extracted from that area, i.e., the tile number "4". Since the image 34b is an enlarged version of the image 32b, the correspondence between area numbers in the two images can be derived easily based on the magnification factor. In the illustrated example, the area number "4" in the image 32b corresponds to area numbers "15", "16", "19", and "20" in the image 34b. It is known therefore that the areas in the image 34b identified by those area numbers are automatically known to be areas filed with a single color. By mapping these image areas to the tile number "4" mapped to the area number "4", the data for tile images extracted from the source areas (e.g., the data for the tile numbers "15", "16", "19", and "20") can be excluded from the ultimate image data.

Similarly, by scanning the image 32b to identify areas corresponding to those areas in the enlarged image 34b that are filled with a single color, the lower half of the area number "3", i.e., the area numbers "17" and "18" in the image 34b are found to be areas filled with a single color. Therefore, by also mapping these areas to the tile image with the tile number "4", the data for tile images extracted from the source area (e.g., the data for the tile numbers "17" and "18") can be excluded from the ultimate image data.

According to the embodiment, image data representing the same image with different resolutions is subject to processing. Therefore, by sequentially repeating the above step, beginning with the image with the lowest resolution, redundant areas in a large-sized, high-resolution image can be identified with minimum computational load. Further, as described above, using low-resolution image data where high-resolution image data should otherwise be used produces the likelihood that the original image data can be discarded. Accordingly, high compression rate is expected. In the embodiment described above, an area filled with a single color is detected so that data for tile images covering the identified area is shared. A similar process may also be useful in areas virtually filled with a single color, a random pattern, or a pattern comprising only repetition. Detection of these areas is performed using area-by-area color histogram or frequency analysis, proceeding from a low-resolution image.

Figure 12:
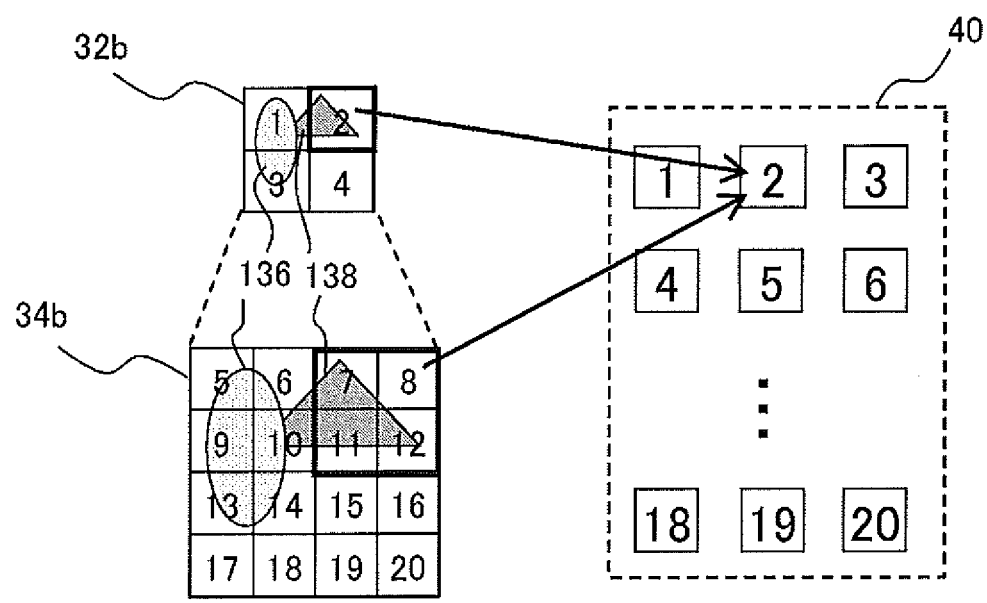
FIG. 12 schematically shows another example of correspondence built between area numbers and tile image data according to the first embodiment when there is redundancy between images.

FIG. 12 schematically shows another example of correspondence built between area numbers and tile image data when there is redundancy between images. The image 32b and the image 34b are similar to those shown in FIG. 11.

Referring to the figure, the area in the image 32b with the area number "2" corresponds to the areas in the image 34b with the area numbers "7", "8", "11", and "12". Since the image 34b is of higher resolution than the image 32b, the tile images from these four areas generally include more information than a simple enlarged version of the tile image (tile number "2") extracted from the area with the area number "2".

However, there may be cases that the areas with the area numbers "7", "8", "11", and "12" in the image 34b are no different from an enlarged version of the tile image with the tile number "2" such as when the original image is a photo and the four areas are out of focus. In such a case, the tile image reference table maps the area numbers of the four areas in the high-resolution image 34b to the tile number "2" extracted from the corresponding area in the low-resolution image 32b collectively. In this process, the data for the tile image with the tile number "2" is not used directly to generate a displayed image from the image 34b. Instead, the tile image reference table defines the correspondence between the magnification factor and the area so that the data is enlarged and only a part thereof is used. For example, redundancy across layers such as this is identified when the difference between an enlarged version of the low-resolution image and a high-resolution image is equal to or below a threshold value, or when frequency analysis of a high-resolution image reveals only a frequency band equal to or lower than a threshold value.

Figure 13:
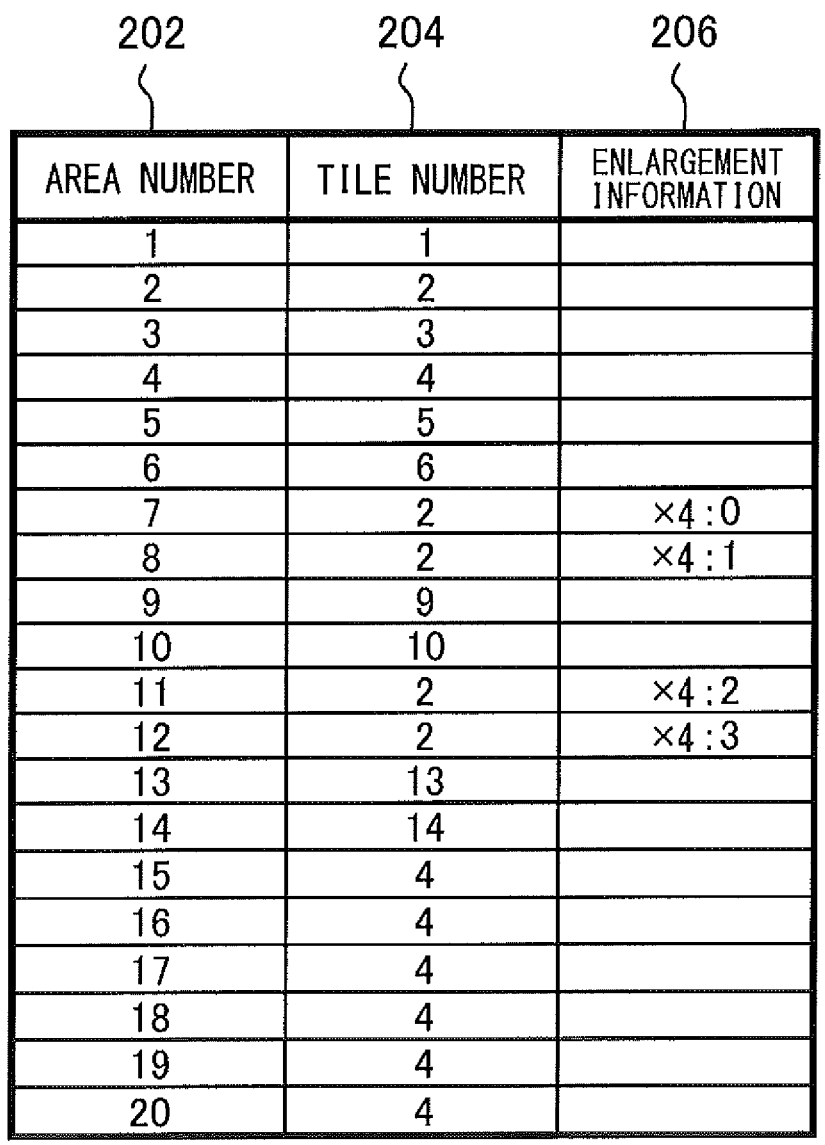
FIG. 13 shows an example of tile image reference table showing correspondence, described with reference to FIGS. 11 and 12, between area numbers and tile numbers.

FIG. 13 shows an example of tile image reference table showing correspondence between area numbers and tile numbers described with reference to FIGS. 11 and 12. The tile image reference table 200 includes an area number field 202, a tile number field 204, and an enlargement information field 206. The area number field 202 contains an area number in an image in the hierarchical data. The figure lists area numbers from "1" to "20" assigned to images from the two layers shown in FIGS. 11 and 12. In practice, the table lists the area numbers from all layers forming the hierarchical data. The tile number field 204 contains a tile number of a tile image referred to for generation of a displayed image for each area. The enlargement information field 206 contains information required when the data for a tile image referred to should be enlarged and indicating the magnification factor and the position in the enlarged image that the area corresponds to.

In the example illustrated in FIG. 11, the areas with the area numbers "15"-"20" included in the image 34b can be rendered using the data for the tile image with the tile number "4". Therefore, the tile number "4" is entered in the tile number field 204 for these area numbers. In the example illustrated in FIG. 12, the areas with the area numbers "7", "8", "11", and "12" included in the image 34b can be rendered by enlarging the tile image with the tile number "2". Therefore, the tile number "2" is entered in the tile number field 204 for these area numbers. A format like "×4:0" is used in the table to indicate that these areas are rendered by using an ×4 enlarged version of the image with the tile number "2". The numeral in the format indicates the correspondence between the area rendered and the area used in the tile image, given that the top left, top right, bottom left, and bottom right areas in the enlarged version are identified by identification numbers "0", "1", "2", and "3", respectively.

In the examples illustrated in FIGS. 11 and 12, the tile image referred to is a tile image extracted from the image 32b. However, the image referred to need not be extracted from an image from the original hierarchical data. For example, a single-color tile image may be made available for use regardless of the original image. The tile image thus prepared may be referred to when an image contains an area of a single color. Alternatively, the approach in FIG. 12 may be employed. More specifically, a tile image containing a collection of a plurality of colors may be made available so that, when an image contains an area of a single color, an area in the tile image, containing the collection of colors, having the relevant color may be enlarged for use in rendering. For example, by making available a tile image containing 256× 256 pixels each with different colors, a total of 65536 (=256× 256) types of areas filed each with a single color can be represented by enlarging a pixel in a single tile image.

Figure 14:
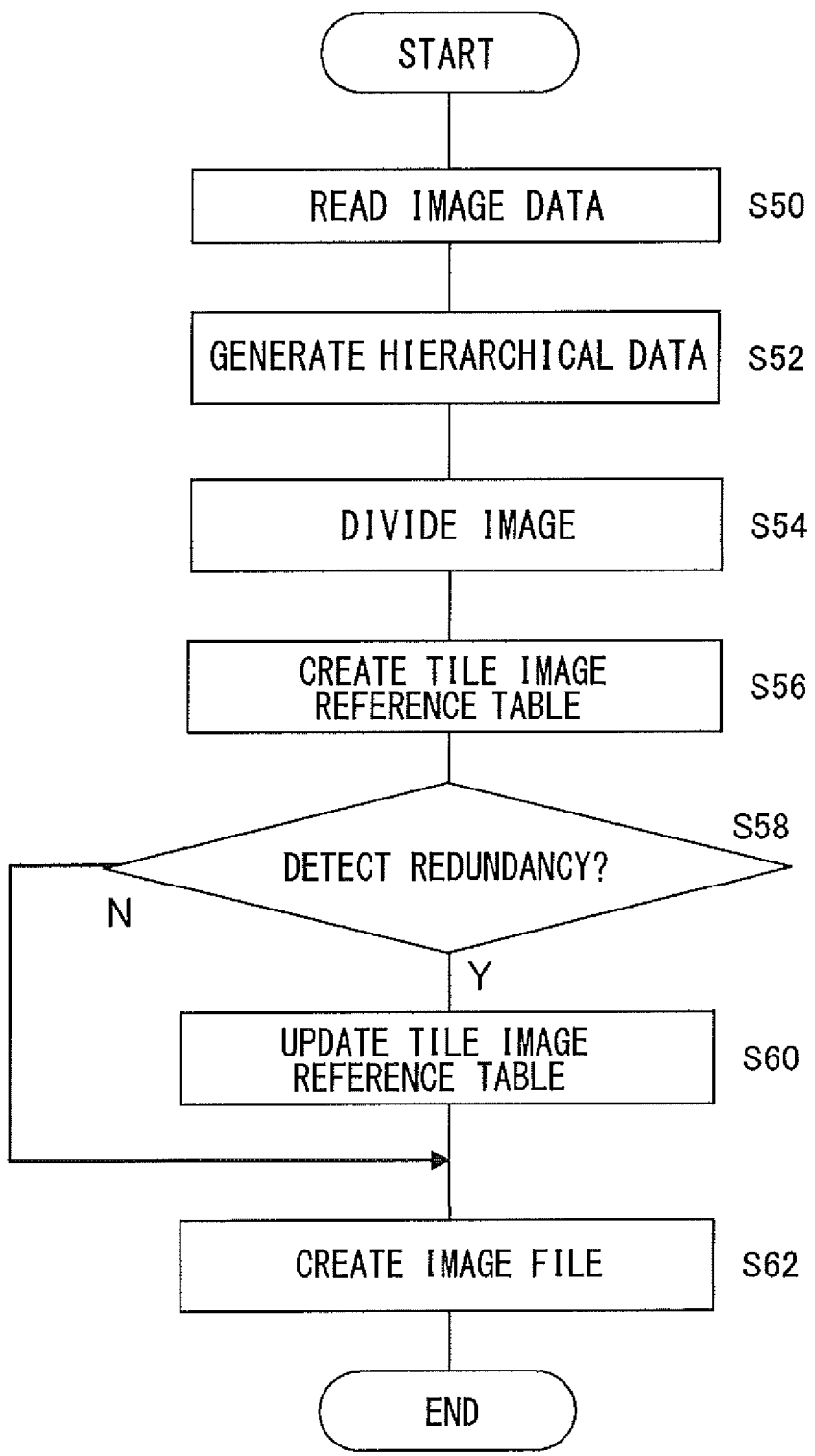
FIG. 14 is a flowchart showing steps whereby the control unit generates an image file according to the first embodiment.

A description will now be given of the operation of the control unit 100b having the function of generating an image file. FIG. 14 is a flowchart showing steps whereby the control unit 100b shown in FIG. 10 generates an image file. Initially, when the user or another processing module provides an input to designate image data, the image hierarchy generation unit 120 reads the designated image data from the hard disk drive 50 (S50). The control unit 100b generates hierarchical data comprising image data of different resolutions by reducing the read image data ordinarily and generating image data having a predetermined resolution (S52). Subsequently, the image division unit 122 divides the image in each layer into tile images and maps the tile number, which is the identification number of the tile image, to the data for the tile image (S54). In practice, the data for the tile image is stored in the main memory 60 and the tile number is mapped to the address in the memory.

The tile number may be identical to the area number defined in the image from which the tile image is extracted. Since the data for a tile image according to the embodiment is independent of positional information, however, the tile number may be assigned independent of the area number. FIGS. 10-12 show the former case. The tile image reference table creation unit 126 creates a tile image reference table at this stage (S56). At this stage, the tile image reference table is created such that an area number defined in the image is mapped to the data for the tile image extracted from the area.

Subsequently, the redundancy detection unit 124 examines redundancy between image within the same layer and redundancy across different layers (S58). More specifically, the redundancy detection unit 124 scans the N-th layer image to identify whether there is any area of a size commensurate with the size of a tile image in the N+1-th layer and containing only a single color. The step is repeated toward higher hierarchies. In addition, the redundancy detection unit 124 attempts to identify an area in the N+1-th layer image containing substantially the same amount of information as the N-th layer image, by examining a differential image produced between an image produced by enlarging the N-th layer image to the size of the N+1-th layer and the N+1-th layer image or by frequency analysis of the N+1-layer image. Any method ordinarily practiced in the field of image processing may be employed for examination.

When the redundancy detection unit 124 detects an area having redundancy (Y in S58), the tile image reference table unit 126 updates the tile image reference table so that a single tile image or a part of a tile image is used to display a plurality of areas in an image, as shown in FIGS. 10 and 11 (S60). The enlargement information as described above is also entered in the table if an image in a higher layer is represented for display by using an image in a lower layer.

Subsequently, the image file generation unit 128 generates an image file that should be ultimately output (S62). If the redundancy detection unit 124 does not detect redundancy (N in S58), the image file generation unit 128 reads all of the data for tile images generated by division in S54 from the main memory 60, arranging the tile images in the order of tile numbers, organizing the tile images into image blocks in the arranged order, and assigning identification information to the image blocks. The image file generation unit 126 creates an image file that also contains the tile image reference table generated in S56.

If the redundancy detection unit 124 detects redundancy (Y in S58), the image file generation unit 128 reads only the data for the tile images with the tile numbers entered in the tile number fields 204 in the ultimate tile image reference table updated in S60, arranging the tile image in the order of tile numbers, organizing the tile image into image blocks in the arranged order, and assigning identification information to the image blocks. The image file generation unit 126 creates an image file that also contains the tile image reference table generated in S60.

Figure 15:
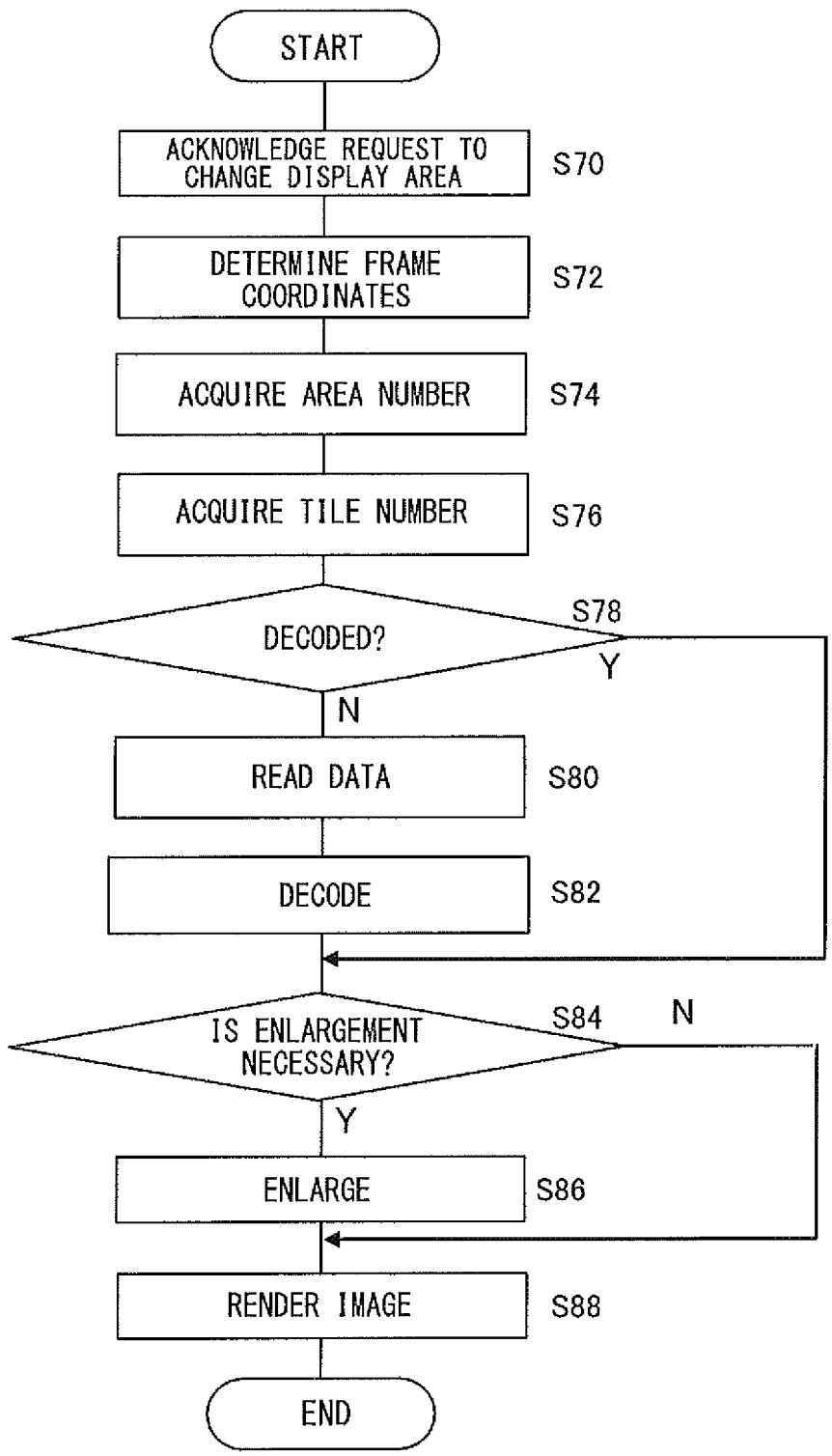
FIG. 15 is a flowchart showing steps whereby the control unit displays an image file according to the first embodiment.

A description will be given of the operation of displaying an image using the image file thus generated. FIG. 15 is a flowchart showing steps for displaying an image file according to the embodiment. The illustrated steps are implemented by the control unit 100a shown in FIG. 7. The flowchart primarily shows a process of reading necessary data from an image file in response to a request to change a display area, and decoding and displaying the image accordingly. The basic flow including loading from a hard disk, prefetching of necessary data, and writing into a buffer memory are similar to the process illustrated in FIG. 5.

Initially, when the user enters a request to change a displayed image via the input device 20 while a part of an image is displayed on the display device 12, the input information acquisition unit 102 acknowledges the request (S70). The tile image identification unit 110 derives the amount of requested change in the displayed image and determines the coordinates of the frame that should be displayed newly (S72). The amount of change in the displayed image represents the amount of movement in the vertical or horizontal direction in the virtual space and the amount of movement in the depth direction. The coordinates of the frame that should be displayed are determined by the frame coordinates of the display area that have been displayed and the amount of change derived.

The tile image identification unit 110 acquires the area number of the area including the post-change displayed image indicated by the frame coordinates (S74). The tile image identification unit 110 refers to the tile image reference table so as to acquire the tile number mapped to the acquired area number (S76). If the buffer memory 70 does not store data produced by decoding the tile image (N in S78), the decoding unit 112 reads the data for the tile image based on the tile number and decodes the tile image (S80, S82).

As shown in FIG. 11, if the tile image reference table defines that a low-resolution tile image should be enlarged for use in rendering a displayed image, the decoding unit 12 enlarges the tile image in response to an instruction from the tile image identification unit 110 and stores the necessary area in the buffer memory 70 (Y in S84, S86). The process is performed even if the tile image is already decoded (Y in S78). Regardless of whether enlargement is required (Y in S84, N in S84), the displayed image processing unit 114 renders the area of the tile image that should be newly displayed in the frame memory (S88). Rendering includes enlarging or reducing the data stored in the buffer memory 70 depending on the required resolution.

As described above, according to the embodiment, data is efficiently compressed by not only examining redundancy within the same layer but also examining redundancy between images from different layers, and by sharing the data for a tile image. The method takes advantage of the feature of the embodiment whereby image data with different resolutions produced from a single image are subject to processing. The feature may be further taken advantage of to compress the tile image reference table efficiently.

Figure 16:
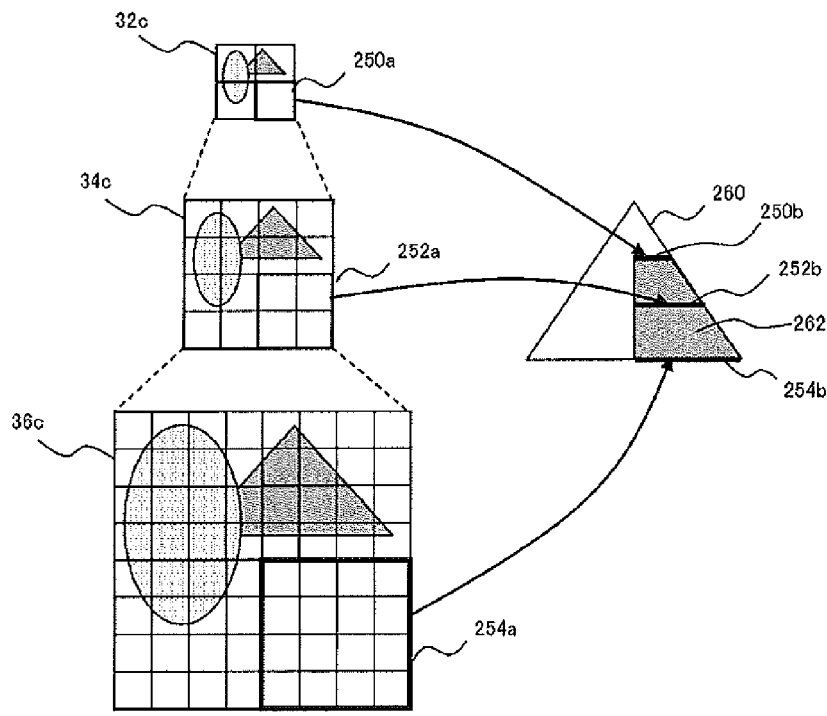
FIG. 16 illustrates redundancy of a tile image reference table according to the first embodiment.

FIG. 16 illustrates redundancy of a tile image reference table. Three images 32c, 34c, and 36c shown in FIG. 16 are images of the first layer, second layer, and third layer, respectively, that form given hierarchical data. An area 250a in the image 32c of the first layer corresponds to an area 252a in the image 34c of the second layer, and an area 254a in the image 36c of the third layer. If, for example, the tile image for the area 250a is an area filled with a single color, the four tile images in the area 252a and the sixteen tile images in the area 254a are also areas filled with a single color.

If a tile image reference table is created from the hierarchical data like this, in view of redundancy, the area numbers of the entire areas included in the areas 250a, 252a, and 254a will be mapped to the same tile number. The tile image reference table 200 shown in FIG. 12 also shows areas mapped to the same tile number "4" arranged in a row (the area numbers "15"-"20"). To exploit such redundancy, area numbers are grouped in the tile image reference table and the data in itself for the tile image reference table for each group is compressed. A generally known technique may be used as a method of compression.

In grouping areas, it is desirable that corresponding areas in a plurality of images from different layers be included in a single group rather than delimiting a series of area numbers arranged in order at certain locations. This is because it is highly likely that these areas can share a tile image.

Representing the areas 250a, 252a, and 254a in the hierarchical image data with lines 250b, 252b, and 254b in a side view 260 of the hierarchical data, it is known that, by grouping an area 262 indicated by a shade, all of the areas included in the group can be rendered by using a single tile image. Therefore, the table need only map the identification number of the group to the identification number of the tile image referred to. As a result, the efficiency of compression is improved. By grouping areas across layers and build a tile image reference table accordingly, the data compression rate is further improved. Boundaries for grouping expected to produce high compression rate are determined in advance, in view of the content or type of the image.

In the description above, it is assumed that a high-resolution image is rendered by referring to a low-resolution tile image by identifying an area filled with a single color etc. in the low to high order of resolution. Meanwhile, there may be cases where a high-resolution image does not inherit a low-resolution image. For example, an area in a low-resolution image may be substantially filled with a single color of blue sky but a high-resolution image shows a small bird.

Therefore, a low-resolution tile image, which is a candidate of mapping, may be enlarged and compared with a corresponding area in a high-resolution image to see whether there are any objects displayed only in the high-resolution image. If such an object is identified in an image with a certain resolution, images with the higher resolution may be rendered by reducing the tile image with the highest resolution in the hierarchal data. In this case, the tile image reference table is also as shown in FIG. 12, the difference being that a single area number is mapped to identification numbers of a plurality of tile images, which are corresponding areas in an image of the highest resolution.

In the above-described example, a plurality of areas are represented by a single tile image in case that an image contains redundancy. Alternatively, a single tile image may be referred to from an area designated by the user even if the image does not contain redundancy. For example, the system may acknowledge user designation of an area that should be replaced by a low-resolution tile image and use a low resolution image consistently to display the area, so as to intentionally prevent an object captured in a high-resolution image from being displayed. Alternatively, areas that need not be enlarged for display (e.g., the background of an image) may be rendered using a low-resolution tile image so as to further reduce the data size, even when a high-resolution image is displayed. In any case, the tile image reference data is as shown in FIG. 12.

According to the embodiment described above, an image file is created from hierarchical data comprising image data with different resolutions produced from a single image such that the data for a tile image is made independent of information on the position in an image. For this purpose, a tile image reference table that maps area numbers indicating positions in an image to tile numbers identifying data for tile images is made available. With this, a single item of image data can be consistently used to render a plurality of areas. Therefore, part of the original data can be discarded so that the image data is compressed.

The original hierarchical data is a presentation of the same image with different resolutions. Therefore, there is high likelihood that that a tile image can be used to represent different layers so that high compression rate is expected. For example, areas filled with a single color, for which a tile image can be used consistently, can be identified easily from a low-resolution image. Thus, the processing load is reduced as compared to a case where the images are scanned independently.

Further, areas for which a single tile image can be used consistently are characterized by high spatial locality. Therefore, the data size is further reduced by grouping areas so as to compress the data for the tile image reference table itself. By grouping areas in a virtual space defined by an image plane and an axis representing resolution, efficient compression across images with different resolutions is possible.

Second Embodiment

In the first embodiment, the function of using a single image as input data and creating an image file including a tile image reference table, and the function of using the image file to display an image are described. In the second embodiment, a description will be given of the function of modifying or revising an image file including a tile image reference table created according to the first embodiment. The second embodiment can be implemented by using the image processing system 1 shown in FIG. 1 and the image processing device 10 shown in FIG. 4. The difference from the first embodiment will be highlighted.

Figure 17:
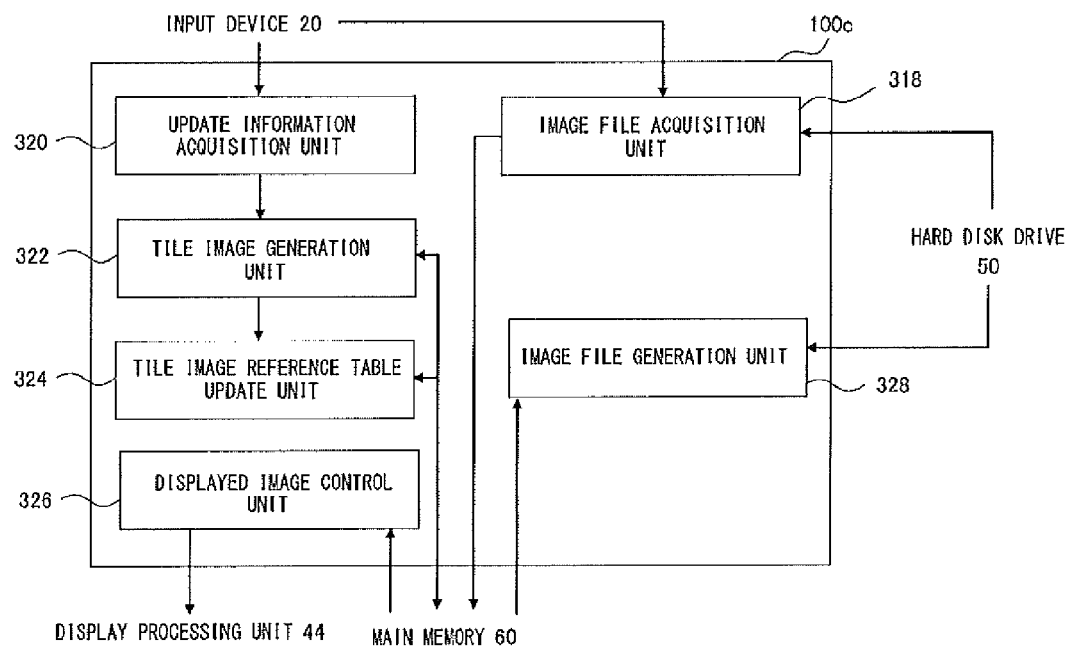
FIG. 17 shows the configuration of the control unit having the function of modifying an image according to the second embodiment.

FIG. 17 shows the configuration of the control unit 100c having the function of modifying an image according to the second embodiment. The control unit 100c comprises an image file acquisition unit 318 configured to acquire an image file subject to modification, an update information acquisition unit 320 configured to acquire update information comprising an area to be updated by modification and image data for the updated portion, a tile image generation unit 322 configured to generate an updated tile image; an image reference table update unit 324 configured to define in the tile image reference table that a new tile image should be referred to, a displayed image control unit 326 configured to display an image being modified, and an image file generation unit 328 configured to generate a modified image file.

The image file acquisition unit 318 acknowledges a user input designating an image subject to modification, reads the relevant image file from the hard disk drive 50, and stores the read file in the main memory 60. The image file includes image data and a tile image reference table, as described in the first embodiment. The update information acquisition unit 320 acquires update information that the user enters via the input device 20 while viewing an image subject to modification displayed on the display device 12. As described above, the update information includes the area that should be updated and the post-updated image data for that area.

The tile image generation unit 322 identifies a tile image that need be updated when the post-update image is applied to the area that should be updated, and generates a new tile image. If the area that should be updated includes only a part of a given tile image, the original tile image is read from the main memory 60 and a new tile image is generated by overwriting only the area that should be updated. If the entirety of a given tile image is included in the area that should be updated, a new tile image is generated by extracting the post-update image. A tile number is assigned to the tile image thus generated. In this case, numbers other than the numbers already assigned to the tile images of the original image are used as the tile numbers assigned.

The tile image generation unit 322 stores the data for the generated tile image in the main memory 60. In this process, the original image data stored by the image file acquisition unit 318 in the main memory 60 is maintained as it is. The newly generated tile image is stored in another storage area. The data for tile images additionally stored form an image block in itself. Subsequently, the tile image reference table update unit 324 replaces the tile number mapped in the tile image reference table stored in the main memory 60 to an area number included in the area that should be updated by the tile number of the newly generated tile image.

The displayed image control unit 326 may comprise functional blocks included in the control unit 100a shown in FIG. 7 of the first embodiment. Illustration is omitted in FIG. 17. The displayed image control unit 326 displays an image subject to modification through steps similar to those described with reference to FIG. 15 of the first embodiment. In the second embodiment, the tile image reference table is updated in accordance with user input. In association with this, the tile image used to render an image is refreshed. Thus, it is possible for the user to modify or revise an image while viewing the displayed image.

As described above, image data included in an image file represents a series of data for tile images. For efficient loading from the hard disk drive 50 to display the image, the series of data is organized to produce image blocks. When a part of the image represented by the image data is updated, a tile image in an existent image block may be overwritten. However, the sizes of the pre-update tile image and the post-update tile image may not necessarily be identical. Therefore, the following steps are necessary to update a tile image.

To update the tile image with the tile number "4" in the image blocks of FIG. 9, the data for tile images with the tile number "5" and later are saved in another storage area. Once the tile image with the tile number "4" is updated, the data for the saved tile images with the tile number "5" and later are joined to the data for the updated tile image "4". Image blocks are rebuilt beginning with the tile number "0" so that each image block does not exceed a basic block size. If the above steps are performed each time the user enters update information, there is a high likelihood that post-update images are displayed less responsively and the job of modification suffers delay.

According to the second embodiment, however, the original image data is not updated. A newly generated tile image is added to a separate storage area and the tile image reference table is updated accordingly. This allows a displayed image to be updated though steps far fewer than in the aforementioned modification steps so that modification can be performed smoothly.

The image file generation unit 328 overwrites the original tile image data with the newly generated tile image data when, for example, the user completes modification. In this process, a series of image data where few storage areas are wasted is generated by rebuilding the data, including saving of subsequent tile images, overwriting of the data with updating tile images, and restoring of the saved tile images as mentioned above. The updated tile image reference table is added to form an image file.

Figure 18:
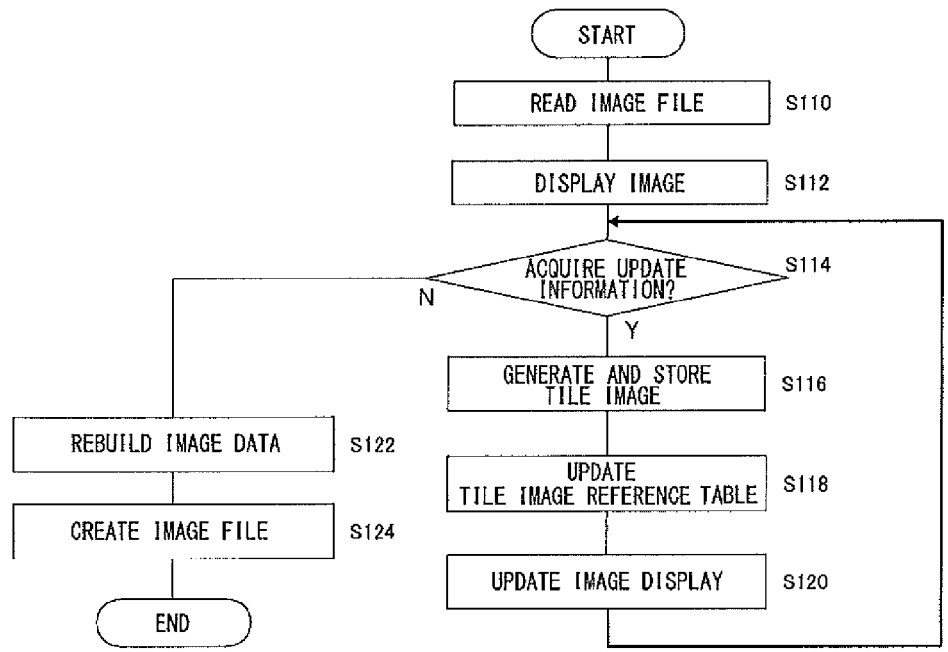
FIG. 18 is a flowchart showing steps performed when the user modifies or revises an image according to the second embodiment.

A description will be given of the operation implemented by the above-described configuration. FIG. 18 is a flowchart showing steps performed by the image processing device when the user modifies or revises an image. Initially, when the user designates an image file subject to modification, the image file acquisition unit 318 reads the relevant image file from the hard disk drive 50 and stores the file in the main memory 60 (S110). This causes the displayed image control unit 326 to display the image defined by the image file on the display device 12 (S112). As described in the first embodiment, the image data may not be read into the main memory 60 in its entirety. Only those image blocks that are necessary for display may be read and used to generate a displayed image.

When the user enters update information while viewing the image displayed on the display device 12 (Y in S114), the update information acquisition unit 320 acknowledges the information. The tile image generation unit 322 generates a new tile image for the updated portion, assigns a tile number to the generated tile image, and stores the generated tile image in the main memory 60 (S116). The user may enter update information by, for example, dragging an image desired to be pasted which is displayed in the neighborhood of the image displayed on the display device 12 toward a desired area using a pointing device. Alternatively, the user may directly draw a character or a picture in the image using a pointing device.

Subsequently, the tile image reference table update unit 324 maps the area corresponding to the newly generated tile image to a new tile number in the tile image reference table (S118). This causes the displayed image control unit 326 to update the display on the display device 12 by reading the data for the tile image newly referred to and decoding the read data (S120). The steps S114 through S120 are repeated until the modification is completed and update information is no longer available.

If the tile image for the same area as the data for the tile image previously stored in the main memory 60 in S116 is updated again, the main memory 60 is prevented from becoming heavily loaded with data temporarily by overwriting the previously generated and stored tile image. In anticipation of a case where the size of overwriting data is larger than that of the data for the tile image previously stored, a newly created tile image for a different area is stored in the main memory 60 such that the newly created tile image is stored at an address removed from the storage area of the data for the tile image already stored by a predetermined space.

When the completion of modification is detected from user input, etc. (N in S114), the image file generation unit 328 rebuilds the image data by incorporating the newly generated tile image stored in the main memory 60 into the image data in the original image file (S122). More specifically, the data for the pre-update tile image is discarded and the data for the new tile image is inserted at the same position, whereupon all pieces of tile image data are concatenated. The image data thus rebuilt and the ultimate tile image reference table updated in S118 are used to form an image file (S124).

In S122, data may be compressed by examining redundancy in the image data resulting from incorporating the new tile image data, using the same method as described in the first embodiment, and by further updating the tile image reference table. The tile image reference table may be compressed as in the first embodiment.

When the user initiates an operation of undoing the immediately preceding updating of an image, the tile image reference table update unit 324 maps the relevant area to the pre-update tile number again. Since the data for the tile image itself is not updated, the image can be returned to the initial state easily. Mapping in the tile image reference table is similarly changed in redo of an operation.

If an area represented by the same tile image is modified several times, the tile image previously generated and stored in the main memory 60 may not be overwritten and the newly generated data may be stored in another memory area. With this, Undo or Redo may be performed in multiple stages by only changing the mapping in the tile image reference table when an area represented by the same tile image is modified several times.

If modification to an image is such that an image is enlarged and pasted to another image, the tile image reference table may be updated so as to refer to the source data for the image that should be pasted instead of generating data for an enlarged image data. As described with reference to FIG. 11 of the first embodiment, the amount of information in the data for a tile image which is an enlarged version of the source image that should be pasted is hardly different from that of the source image. Therefore, substantially the same displayed image can be obtained by enlarging the source image at the time of displaying the image. In this way, the data size is prevented from growing.

Third Embodiment

In this embodiment, a description will be given of the function of creating an image by applying the function of modifying an image described in the second embodiment. The third embodiment is configured similarly as the second embodiment, using the image processing system 1 shown in FIG. 1, the image processing device 10 shown in FIG. 4, and the control unit 100c shown in FIG. 17. The discussion here focuses on a difference from the second embodiment.

In the second embodiment, an image file containing existent hierarchical data is modified. In the third embodiment, an image is created from a scratch where no existent hierarchical data is available. The user creates an image by, for example, drawing a picture on a white display screen as a canvas, using a pointing device. Alternatively, the user may paste data for a photo or a picture available in advance.

Figure 19:
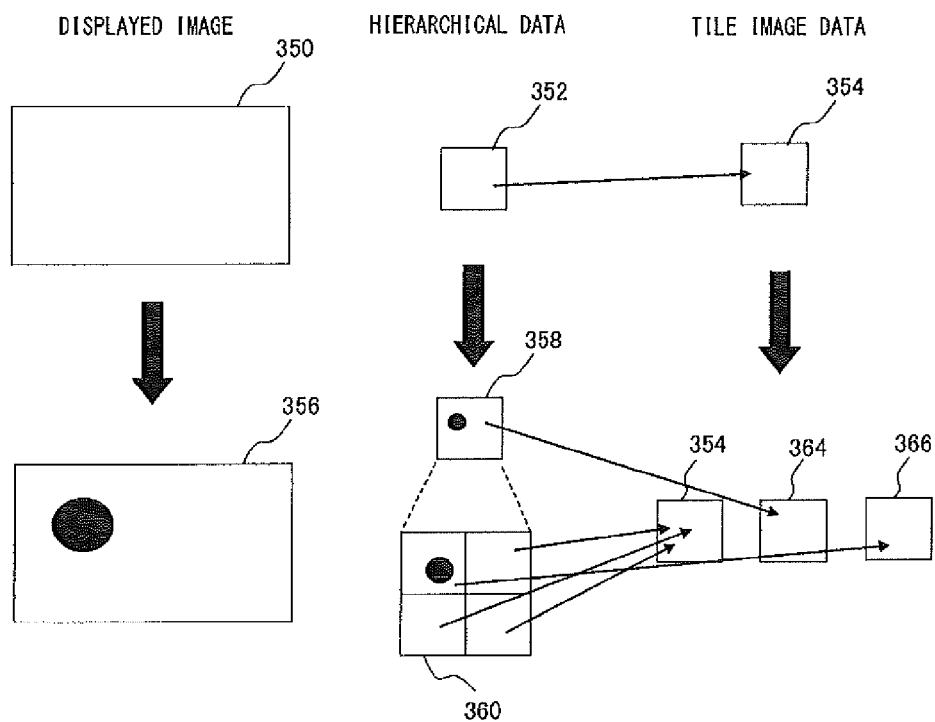
FIG. 19 schematically shows changes that occur in the displayed image, hierarchical data, and tile image data before and after an image is created according to the third embodiment.

FIG. 19 schematically shows changes that occur in the displayed image, hierarchical data, and tile image data before and after an image is created. Before an image is created, i.e., in an initial state, a displayed image 350 represents the canvas and so is an all-white image. Since the notion of enlargement or reduction is nonexistent at this stage, the hierarchical data may only contain a single layer containing an image 352. The tile image reference table maps the area to tile image data 354 comprising a single all-white image.

When the user draws something on the canvas of the displayed image 350, creating a displayed image 356, there is created the notion of enlargement or reduction. An image 360 in a layer with a higher resolution is introduced in the hierarchical data in addition to the lowest-layer image 358. Two or more layers may be introduced. Introduction of new layers may be predefined depending on the maximum resolution permitted, or, alternatively, may be adaptively determined by the detail of drawing done by the user.

Areas not touched upon remain all-white areas even if the number of layers in the hierarchical data is increased associated with the drawing. Data for a new tile image is generated and added only for an area where drawing is done. Referring to FIG. 19, only tile image data 364 for the lowest-layer image 358 and tile image data 366 for an area in the image 360 of the newly added layer where drawing is done are generated. The areas in the image 360 where drawing is not done are rendered by referring to the all-white tile image data 354 initially made available as a canvas. Mapping between an area in the hierarchical data and tile image data is defined in the tile image reference table.

The operation of the control unit 100 having the function of creating an image according to the third embodiment is similar to the operation according to the second embodiment described with reference to FIG. 18. However, the control unit 100 according to the third embodiment is unique in that an all-white tile image that is initially made available is referred to without exception to render an area where drawing is not done and that hierarchies and tile image data are added as the drawing proceeds. According to this embodiment, the tile image reference table is used to make data for a tile image independent of the position in the hierarchical data. This implements a function whereby the user himself or herself can create an image, enlarging or reducing the image, such that minimum change is required in the data.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the first embodiment, the tile image reference table is basically formed such that a single item of data for a tile number is determined from an area number. An image obtained by using the data for the tile image is applied to the necessary area. Alternatively, animation may be presented by mapping a single area number to data for a plurality of tile images in the tile image reference table and displaying the plurality of corresponding tile images sequentially to display the area. By using this mode only in a limited area in the image such that, for example, a mark flashes in a newly updated portion or an important portion in the image, the user's attention can be drawn to the area.

The entire image displayed on the screen may be switched by preparing a plurality of sets of hierarchical data and mapping all area numbers to data for a plurality of tile images that represent the same area in the respective hierarchical data. For example, three sets of hierarchical data comprising images of scenery taken by a camera fixed in a rooftop in the morning, in the afternoon, and at night, respectively, may be prepared and the aforementioned mapping may be defined in the tile image reference table. By using, for example, cross fading to smoothly switch between images for display, changes in the scenery in a day can be displayed in such a manner that enlargement or reduction is possible.

Normally, in a polygon model used in a display system in game devices, a plurality of textures are prepared for a single model. An ultimate image is created by processing the texture by a shader. Creation of a single ultimate image by using data a plurality of items of texture data is facilitated by mapping the plurality of items of texture data to each area number. For example, in creating an image file for an oil painting, each area number is mapped to a tile image showing a plane picture and a tile image as a bump map representing concavity and convexity. The tile image for a picture and the tile image as a bump map each presents a hierarchical structure. By using a shader to create an image for each area based on the mapping as described above, bump mapping can be easily achieved in an image that can be enlarged or reduced. It will also be easy to use hierarchical data as a texture applied to a polygon model.

Further, voxel data can be formed by using a plurality of tile images mapped to each area number as images that represent variation in the direction of depth in the image. Generally, areas at the edge of a box in voxel data are characterized by small amount of information, allowing sharing of tile images for display, as in the first embodiment. Therefore, benefit of data compression is profound. By including a plurality of tile images in each of a plurality of images mapped to each area number and representing the direction of depth, animation or CG effects in voxel display can be created.

When data is acquired via a network while an image is being displayed, the mapping in the tile image reference table may be modified real time. For example, each time an image of news or an image of a score in a sports event is acquired via a network, the tile image mapped to a portion of an image may be updated with the newly acquired data. This makes it easy to additionally display real time information while an image is being displayed.

DESCRIPTION OF THE REFERENCE NUMERALS 1 image processing system, 10 image processing device, 12 display device, 20 input device, 30 0-th layer, 32 first layer, 34 second layer, 36 third layer, 38 tile image, 44 display processing unit, 50 hard disk drive, 60 main memory, 70 buffer memory, 72 buffer area, 74 buffer area, 90 frame memory, 100 control unit, 102 input information acquisition unit, 106 load block determination unit, 108 loading unit, 110 tile image identification unit, 112 decoding unit, 114 displayed image processing unit, 120 image hierarchy generation unit, 122 image division unit, 124 redundancy detection unit, 126 tile image reference table creation unit, 128 image file generation unit, 200 tile image reference table, 318 image file acquisition unit, 320 update information acquisition unit, 322 tile image generation unit, 324 tile image reference table update unit, 326 displayed image control unit, 328 image file generation unit As described above, the present invention is applicable to information processing devices such as computers, game devices, image display devices, and image rendering devices.

The invention claimed is:
1. An image file generation device comprising:
an image hierarchy generation unit configured to generate a plurality of pieces of image data with different resolutions from input image data and generate hierarchical data formed by hierarchizing the plurality of pieces of data as layers according to resolution;
an image division unit configured to divide image data at each layer of the hierarchical data into tile images of predetermined sizes;
a tile image reference table creation unit configured to create a tile image reference table that maps post-division areas in the image data at each layer of the hierarchical data to data for tile images used to render the areas; and an image file generation unit configured to generate an image file that includes data for the tile image and the tile image reference table.

2. The image file generation device according to claim 1, wherein the tile image reference table maps data for a given tile image to a plurality of areas, and the image file does not include data for a tile image that is not mapped in the tile image reference table.

3. The image file generation device according to claim 1, further comprising:
   a redundancy detection unit configured to analyze an image in a layer of a given resolution so as to identify an area in an image in a layer of a higher resolution that can be rendered using data for a tile image included in the image of the given resolution,
   wherein the tile image reference table creation unit maps the area identified by the redundancy detection unit to the data for the tile image used for rendering.

4. The image file generation device according to claim 3, wherein the redundancy detection unit refers to the tile images forming the image subject to analysis so as to identify a tile image comprising a single color, and identifies an area in the image in the layer of the higher resolution corresponding to the identified tile image as an area that can be rendered by using the data for the identified tile image.

5. The image file generation device according to claim 3, wherein the redundancy detection unit compares an enlarged version of the image subject to analysis enlarged to an image size of the layer of the higher resolution with the image in the layer of the higher resolution, and identifies an area in the image in the layer of the higher resolution producing a difference that is less than or equal to a threshold value as an area that can be rendered by using the data for the tile image of the image subject to analysis.

6. The image file generation device according to claim 1, wherein the tile image reference table creation unit organizes the post-division areas into a plurality of groups comprising images from different layers, and compresses, for each group, data that maps the areas to data for tile images used to render the areas.

7. An image processing device comprising:
   a storage device configured to store an image file that includes data for tile images produced by dividing image data into a predetermined size, the image data representing a single image with different resolutions, and includes a tile image reference table that maps post-division areas in the image data in a hierarchical structure produced by hierarchizing the image data according to resolution, to data for tile images used to render the post-division areas;
   an input information acquisition unit configured to acknowledge a user request to change a display area including shift on an image plane and change in resolution;
   a tile image identification unit configured to identify data for a tile image necessary to render an area that should be newly displayed in response to the request to change a display area, by referring to the tile image reference table; and
   a displayed image processing unit configured to read the data for the identified tile image from the storage device and to render the area that should be newly displayed.

8. The image processing device according to claim 7, wherein the image file does not include data for a tile image that is not mapped in the tile image reference table.

9. The image processing device according to claim 7, wherein the tile image reference table maps an area in an image of a given resolution to data for a tile image that can be used to render the area and included in an image of a resolution lower than the given resolution.

10. The image processing device according to claim 9, wherein the tile image reference table maps an area in an image of a given resolution to the data for the tile image included in the image of the lower resolution and further defines a magnification factor referred to when the tile image is used to render the area, and
    the displayed image processing unit renders the area by enlarging the tile image by the magnification factor.

11. The image processing device according to claim 7, wherein the input information acquisition unit acknowledges a request to change a part of an image that should be displayed, the device further comprising:
    a tile image generation unit configured to newly generate data for a tile image for an area that should be updated and store resultant data in a storage area in the storage device different from an area for pre-update tile image data included in the image file; and
    a tile image reference table update unit configured to update data for a tile image mapped in the tile image reference table to the area that should be updated with the newly generated data for the tile image,
    wherein the displayed image processing unit reads the newly generated data for the tile image in accordance with the updating of the tile image reference table and refreshes the displayed image.

12. The image processing device according to claim 11, wherein
    the input information acquisition unit acknowledges a request to cancel the request to update a part of an image,
    the tile image reference table update unit returns the newly-generated data for the tile image mapped in the tile image reference table to the area that should be updated to the data for the tile image previously mapped to the area that should be updated, and
    the displayed image processing unit renders the displayed image afresh in accordance with the updating of tile image reference table.

13. An image file generation method comprising:
    reading image data from a memory, generating a plurality of pieces of image data with different resolutions, and generate hierarchical data formed by hierarchizing the plurality of pieces of data as layers according to resolution;
    dividing image data at each layer of the hierarchical data into tile images of a predetermined size;
    creating a tile image reference table that maps post-division areas in the image data at each layer of the hierarchical data to data for tile images used to render the areas; and
    generating an image file that includes data for the tile image and the tile image reference table and outputting the table to the memory.

14. The image file generation method according to claim 13, wherein the tile image reference table maps data for a given tile image to a plurality of areas, and the image file does not include data for a tile image that is not mapped in the tile image reference table.

15. An image processing method comprising:
    reading, from a memory, an image file that includes data for tile images produced by dividing image data into a predetermined size, the image data representing a single image with different resolutions, and includes a tile image reference table that maps post-division areas in the image data in a hierarchical structure produced by hierarchizing the image data according to resolution, to data for tile images used to render the post-division areas;

acknowledging a user request to change a display area including shift on an image plane and change in resolution;

identifying data for a tile image necessary to render an area that should be newly displayed in response to the request to change a display area, by referring to the tile image reference table; and rendering the area that should be newly displayed based on the data for the identified tile image.

16. The image processing method according to claim 15, wherein the image file does not include data for a tile image that is not mapped in the tile image reference table.

17. The image processing method according to claim 15, further comprising:

acknowledging a request to change a part of an image that should be displayed;

newly generating data for a tile image for an area that should be updated and storing resultant data in a storage area in the memory different from an area for pre-update tile image data included in the image file;

updating data for a tile image mapped in the tile image reference table to the area that should be updated with the newly generated data for the tile image; and reading the newly generated data for the tile image in accordance with the updating of the tile image reference table and refreshing the displayed image.

18. A non-transitory computer readable recording medium containing a computer program, the computer program comprising:

a module configured to read image data from a memory, generate a plurality of pieces of image data with different resolutions, and generate hierarchical data formed by hierarchizing the plurality of pieces of data as layers according to resolution;

a module configured to divide image data at each layer of the hierarchical data into tile images of a predetermined size;

a module configured to create a tile image reference table that maps post-division areas in the image data at each layer of the hierarchical data to data for tile images used to render the post-division areas; and a module configured to generate an image file that includes data for the tile image and the tile image reference table and output the table to the memory.

19. A non-transitory computer readable recording medium containing a computer program, the computer program comprising:

a module configured to read, from a memory, an image file that includes data for tile images produced by dividing image data into a predetermined size, the image representing a single image with different resolutions, and includes a tile image reference table that maps post-division areas in the image data in a hierarchical structure produced by hierarchizing the image data according to resolution, to data for tile images used to render the post-division areas;

a module configured to acknowledge a user request to change a display area including shift on an image plane and change in resolution;

a module configured to identify data for a tile image necessary to render an area that should be newly displayed in response to the request to change a display area, by referring to the tile image reference table; and a module configured to render the area that should be newly displayed based on the data for the identified tile image.

20. A data structure of an image file read from a storage device to display at least a part of an image on a display, the data structure mapping data for tile images to a tile image reference table, the data for tile images being produced by dividing image data into a predetermined size, the image data representing a single image with different resolutions, and the tile image reference table mapping post-division areas in the image data in a hierarchical structure produced by hierarchizing the image data according to resolution to data for tile images used to render the post-division areas, wherein the tile image reference table maps data for a given tile image to a plurality of areas, and the image file does not include data for a tile image that is not mapped in the tile image reference table.

* * * * *